United States Patent
Hasegawa

(10) Patent No.: US 7,746,747 B2
(45) Date of Patent: Jun. 29, 2010

(54) OPTICAL RECORDING MEDIUM DRIVE APPARATUS AND METHOD OF DETERMINING THE NUMBER OF LAYERS

(75) Inventor: Shinichi Hasegawa, Kanagawa (JP)

(73) Assignee: Sony NEC Optiarc Inc., Tokyo (JP)

( * ) Notice: Subject to any disclaimer, the term of this patent is extended or adjusted under 35 U.S.C. 154(b) by 461 days.

(21) Appl. No.: 11/854,779

(22) Filed: Sep. 13, 2007

(65) Prior Publication Data

US 2008/0080345 A1    Apr. 3, 2008

(30) Foreign Application Priority Data

Sep. 28, 2006  (JP) .............................. 2006-264428
Nov. 7, 2006   (JP) .............................. 2006-301724

(51) Int. Cl.
G11B 7/00    (2006.01)
(52) U.S. Cl. .............. 369/53.22; 369/53.23; 369/53.28; 369/53.45; 369/44.25
(58) Field of Classification Search ................... None
See application file for complete search history.

(56) References Cited

U.S. PATENT DOCUMENTS 5,606,546 A * 2/1997 Best et al. ................ 369/275.1

2005/0068873 A1    3/2005 Chung
2005/0276199 A1*  12/2005 Sugai ...................... 369/53.22

FOREIGN PATENT DOCUMENTS

| JP | 2004-342309 | 12/2004 |
| JP | 2005-155791 | 6/2005 |
| JP | 2006-277847 | 10/2006 |
| JP | 2007-520834 | 7/2007 |
| WO | WO 2005/031735 A1 | 4/2005 |

* cited by examiner

Primary Examiner—Muhammad N. Edun
(74) Attorney, Agent, or Firm—Oblon, Spivak, McClelland, Maier & Neustadt, L.L.P.

(57) ABSTRACT

In an optical recording medium drive apparatus, an optical recording medium is illuminated with a laser beam emitted from a head via an objected leans, and the head detects light reflected from the optical recording medium being illuminated with the laser beam. A signal generator generates a reflected light signal in accordance with the reflected light detected by the head. A controller drives the objective lens via a focusing unit, and detects peaks in the reflected light signal obtained when the objective lens is driven in a focusing direction. The controller determines whether the optical recording medium is of a single layer type or a multiple layer type by determining whether a pattern of the detected peaks is similar to one of patterns which can occur if the optical recording medium is of the single layer type.

4 Claims, 16 Drawing Sheets

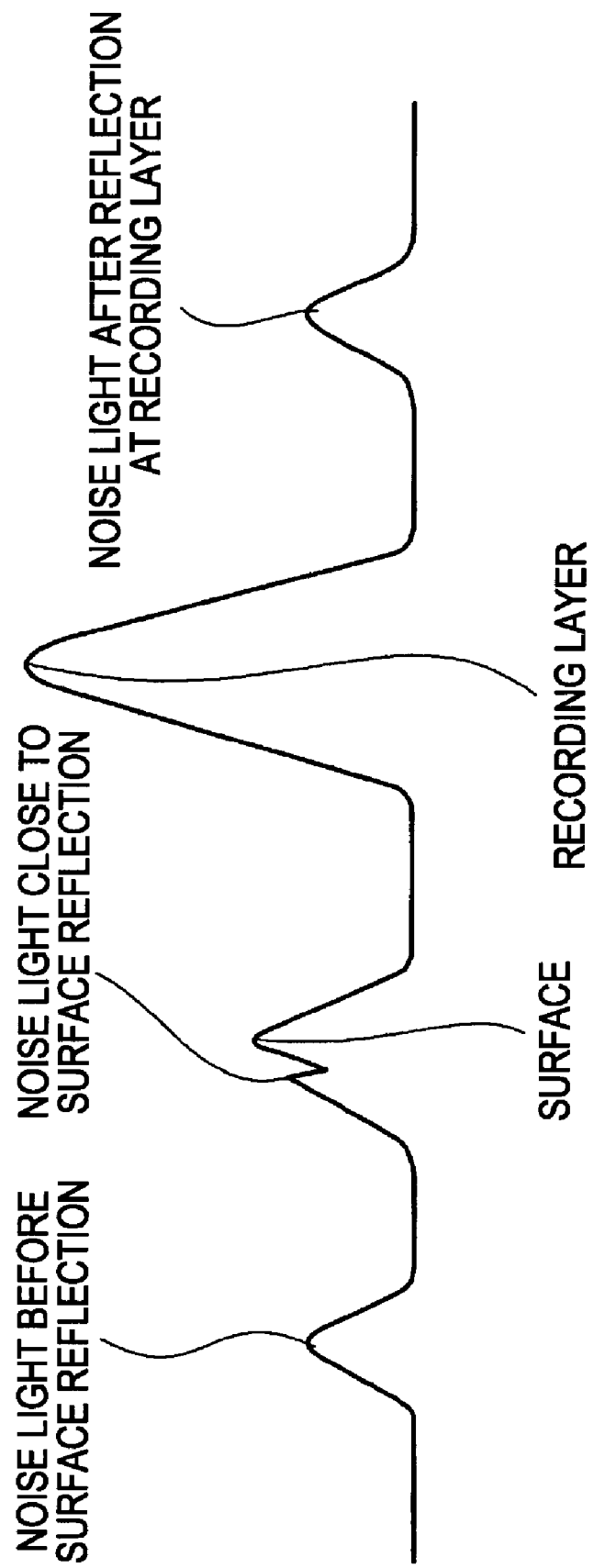

OPTICAL RECORDING MEDIUM DRIVE APPARATUS AND METHOD OF DETERMINING THE NUMBER OF LAYERS

CROSS REFERENCES TO RELATED APPLICATIONS

The present invention contains subject matter related to Japanese Patent Application JP 2006-301724 filed in the Japanese Patent Office on Nov. 7, 2006, the entire contents of which are incorporated herein by reference.

BACKGROUND OF THE INVENTION

1. Field of the Invention

The present invention relates to an optical recording medium drive apparatus adapted to record and/or read a signal on/from an optical recording medium by illuminating the optical recording medium with light, and a method of determining the number of layers of an optical recording medium.

2. Description of the Related Art

One technique to record and read digital data is to use an optical disk (or magneto-optical disk) such as a CD (Compact Disc), a MD (Mini-Disc), or a DVD (Digital Versatile Disc) as a recording medium. The optical disk recording medium (hereinafter referred to simply as the optical disk) is a generic expression of recording media configured in the form of a disk on which a signal is recorded in the form of pits or marks so that the signal can be read by illuminating the disk with laser light and detecting a change in intensity of reflected light.

A disk drive for recording/reading data on/from an optical disk can be configured to handle a plurality of types of optical disks. Parameters used in the recording/reading operation are different depending on the type of the optical disk. Therefore, when an optical disk is mounted on the disk drive, the disk drive determines the type of the mounted optical disk.

When an optical disk of a certain type has a plurality of recording layers, it is necessary to detect the number of recording layers.

In general, an optical disk has physical property information recorded thereon to indicate physical properties such as the type of the disk, the number of recording layers, and so on, so that the disk drive can determine the type of the disk, the number of recording layers, etc. by reading the physical property information.

For further information about related techniques, see, for example, Japanese Unexamined Patent Application Publication No. 2006-155791.

SUMMARY OF THE INVENTION

To read data from an optical disk, it is necessary that focusing and tracking be controlled by a focus servo control operation and a tracking servo control operation.

To handle a plurality of types of optical disks for which optimum optical parameters are different, it is necessary to try various parameters in the servo control operation until optimum parameters for a currently mounted optical disk are found and the servo control operation works successfully using the optimum parameters. Therefore, it takes a considerably long time to determining the type of the disk and the number of layers from the physical property information. Thus, there is a need for a technique to make the determination in a short time.

According to an embodiment of the present invention, there is provided an optical recording medium drive apparatus including head means for emitting a leaser beam so as to illuminate an optical recording medium via an objective lens which is disposed such that the objective lens is movable at least toward and apart from the optical recording medium in a focusing direction, and for detecting light reflected from the optical recording medium being illuminated with the laser beam, focusing means for driving the objective lens in the focusing direction, signal generation means for generating a reflected light signal in accordance with the reflected light detected by the head means, and control means for driving the objective lens via the focusing means, detecting a peak or peaks of the reflected light signal obtained when the objective lens is driven, determining whether a pattern of the detected peak(s) is similar to one of patterns which can occur when the optical recording medium is of a single layer type, and determining whether the optical recording medium is of the single layer type or a multiple layer type on the basis of the result of the determination as to the pattern.

The optical recording medium drive apparatus configured in the above-described manner is capable of determining whether a mounted optical recording medium is of a single layer type or a multiple layer type, from the reflected light signal obtained when the objective lens is driven in the focusing direction.

In the determination process, it is checked whether the pattern of the reflected light signal obtained when the objective lens is driven in the focusing direction is similar to one of reference patterns which can occur for the optical recording medium of the single layer type. Because the reference patterns are prepared taking into account possible noise peaks, it is possible to correctly determine whether the given optical recording medium is of the single layer type or the multiple layer type even when the reflected light signal includes a noise peak.

Thus, the present invention provides the advantage that the determination can be quickly made as to whether the optical recording medium is of the single layer type or the multiple layer type from the reflected light signal obtained when the objective lens is driven in the focusing direction, without having to read physical property data in the state in which the servo control operation is performed.

Furthermore, it is possible to correctly determine whether the optical recording medium is of the single layer type or the multiple layer type even when the reflected light signal includes a noise peak. If the specifications of the optical recording medium allow the single layer or the dual layer, it is possible to correctly the number of layers for any optical recording medium.

BRIEF DESCRIPTION OF THE DRAWINGS

FIG. 3 illustrates an example of a reflected light signal detected by a three-wavelength single-lens pickup in detection of the number of layers;

FIGS. 7A to 7C illustrate examples of patterns of peaks of a reflected light signal obtained when an objective lens is driven in a focusing direction, wherein FIG. 7A illustrates a pattern obtained for a BD of a single layer type, FIG. 7B illustrates a pattern obtained for a DVD of a single layer type, and FIG. 7C illustrates a pattern obtained for a CD;

DESCRIPTION OF THE PREFERRED EMBODIMENTS

The present invention is described in further detail below with reference to specific embodiments.

First Embodiment

Figure 1:
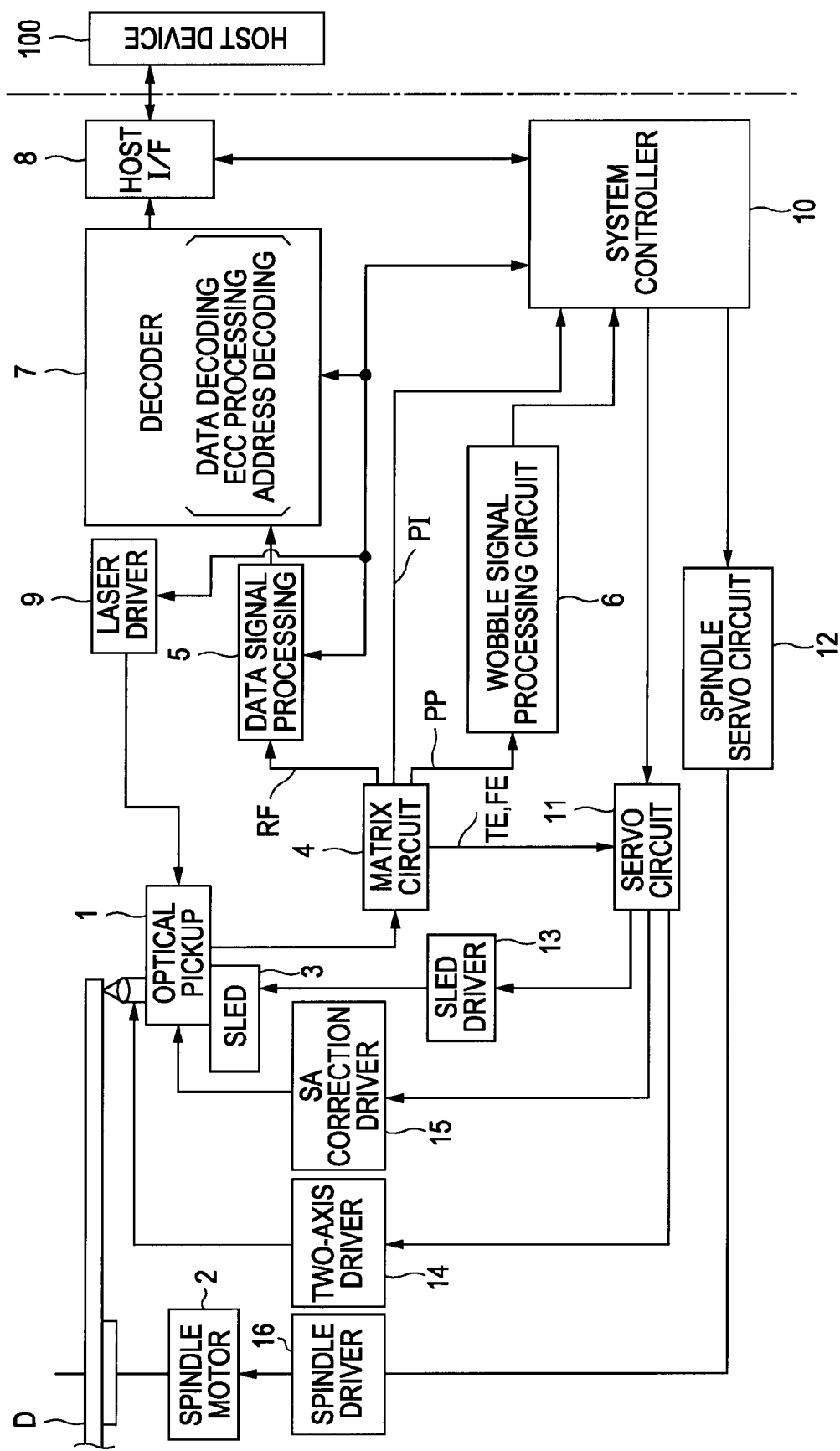
FIG. 1 is a block diagram illustrating an internal configuration of an optical recording medium drive apparatus according to an embodiment of the present invention.

FIG. 1 is a block diagram illustrating an internal configuration of a disk drive according to an embodiment of the present invention.

The disk drive is configured to handle various kinds of optical disks D including CD (Compact Disc), DVD (Digital Versatile Disc), and BD (Blu-ray Disc). For the above purpose, the optical pickup 1 is configured such that laser light having one of wavelengths 780 nm, 650 nm, and 405 nm selected depending on the type of the optical disk D is output from a single laser diode via a single objective lens thereby illuminating the optical disk D. This configuration is called a three-wavelength single-lens pickup.

In the present embodiment, the disk drive is configured for use to read data only. The disk drive is capable of reading data not only from an optical disk D of a ROM type in which data is recorded in the form of pits and lands, but also from an optical disk D of a recordable type such as a write-once optical disk or a rewritable optical disk.

In the present embodiment, the disk drive is configured such that when the optical disk D is a BD (Blu-ray Disc), the disk drive can handle both types of BDs, i.e., a BD with a SL (Single layer) recording layer and a BD with a DL (Dual Layer) recording layer.

In FIG. 1, in a recording/reading operation, the optical disk D mounted on a turn table (not shown) of the disk drive is rotated at a constant linear velocity (CLV) by a spindle motor 2.

In the reading operation, information recorded in the form of pits or marks on tracks on the optical disk D is read by the optical pickup (optical head) 1.

The optical disk D has read-operation management information such as physical property information or the like recorded in the form of embossed pits or wobbling grooves, and such information is also read by the optical pickup 1. In the case where the optical disk D is of a recordable type, ADIP information embedded in a wobbling groove track is also read by the optical pickup 1.

The optical pickup 1 includes a laser diode serving as a source of a laser beam, a photodetector for detecting reflected light, an objective lens serving as an output end through which to output the laser beam, and an optical system adapted to direct the laser beam onto a disk recording surface via the objective lens and direct reflected light to the photodetector. The laser diode in the optical pickup 1 is adapted to output a laser beam with a wavelength of 780 nm, 650 nm, or 405 nm.

In the optical pickup 1, the objective lens is held by the two-axis mechanism such that the objective lens is movable in a tracking direction and a focusing direction.

The optical pickup 1 is movable as a whole by a sled mechanism 3 in a radial direction of the disk.

The laser diode in the optical pickup 1 is driven by a drive signal (drive current) supplied from a laser driver 9, whereby the laser beam is emitted from the laser diode.

In the present embodiment, in order to allow a BD to be used as the optical disk D, the optical pickup 1 also includes a mechanism for correcting spherical aberration although it is not shown in the figure. The spherical aberration correction mechanism is driven by a SA (Spherical Aberration) correction driver 15 to correct the spherical aberration as will be described in detail later.

Information carried by the light reflected from the optical disk D is detected by the photodetector and output as an electrical signal corresponding to the amount of light incident on the photodetector. The output electrical signal is supplied to a matrix circuit 4.

The matrix circuit 4 includes a current-voltage converter adapted to convert a current output from each photosensor device of the photodetector and a matrix operation/amplification circuit adapted to produce a necessary signal by performing a matrix operation.

More specifically, a RF signal (read data signal) corresponding to read data, and a focus error signal FE and a tracking error signal TE used in the servo control are produced.

A push-pull signal PP for detecting wobbling of a groove is also produced.

Furthermore, in the present embodiment, a pull-in signal PI used in detection of the number of layers, which will be described in detail later. The pull-in signal PI is given by an envelope of a read data signal.

The playback data signal (the RF signal) output from the matrix circuit 4 is supplied to a data signal processing circuit 5, the focus error signal FE and the tracking error signal TE are supplied to a servo circuit 11, and the push-pull signal PP is supplied to a wobble signal processing circuit 6.

The pull-in signal PI is supplied to a system controller 10.

The data signal processing circuit 5 converts the playback data signal into a two-level data signal. The data signal processing circuit 5 also produces a clock signal by performing a PLL operation. Furthermore, the data signal processing circuit 5 detects a synchronization signal from the two-level data signal.

The two-level data sequence produced via the binarization process performed by the data signal processing circuit 5 is supplied to a decoder 7. The generated clock signal is supplied as an operation clock to various parts. The detected synchronization signal is supplied to the decoder 7.

The decoder 7 decodes the two-level data sequence. The decoding process performed by the decoder 7 includes decoding of read data, deinterleaving, ECC decoding, and address decoding.

In the reading operation, the two-level data sequence output from the data signal processing circuit 5 is decoded in synchronization with the synchronization signal thereby obtaining playback data. The read data obtained via the decoding process performed by the decoder 7 is supplied to a host interface 8 and transferred to a host device 100 under the control of the system controller 10. Specific examples of the host device 100 are a computer and an AV (Audio Visual) system. The decoded address data is supplied to the system controller 10.

In the case where the optical disk D is of the recordable type, the optical disk D has management information associated with physical properties of the disk or the like or ADIP information recorded by wobbling grooves.

Under the control of the system controller 10, the wobble signal processing circuit 6 detects the information recorded in the form of wobbling grooves on the optical disk D from the push-pull signal PP output from the matrix circuit 4, and the wobble signal processing circuit 6 supplies the detected information to the system controller 10.

The servo circuit 11 produces a focus servo signal, a tracking servo signal, and a sled servo signal from the focus error signal FE and the tracking error signal TE supplied from the matrix circuit 4, and performs the servo control operation.

More specifically, the focus servo signal and the tracking servo signal are produced on the basis of the focus error signal FE and the tracking error signal TE and supplied to the two-axis driver 14 whereby a focus coil and a tracking coil of the two-axis mechanism of the optical pickup 1 are controlled in accordance with the servo signals. Note that in the servo control operation, a tracking servo loop and a focusing servo loop are formed by the optical pickup 1, the matrix circuit 4, the servo circuit 11, the two-axis driver 14, and the two-axis mechanism. If the servo circuit 11 receives a track jump command from the system controller 10, the servo circuit 11 turns off the tracking servo loop and outputs a jump pulse thereby performing a track jump operation.

The servo circuit 11 drives the sled mechanism 3 via the sled driver 13 in accordance with a sled error signal obtained by extracting a low-frequency component from the tracking error signal TE and in accordance with an access command supplied from the system controller 10. The sled mechanism 3 includes a main shaft by which the optical pickup 1 is held, a sled motor, and a transmission gear, although they are not shown in the figure. The sled motor is driven in accordance with the sled drive signal to slide the optical pickup 1 by a specified distance.

The servo circuit 11 is adapted to set a spherical aberration correction value in the SA correction driver 15. More specifically, in accordance with a command from the system controller 10, the servo circuit 11 sets the spherical aberration correction value in the SA correction driver 15. The SA correction driver 15 produces a driving signal in accordance with the spherical aberration correction value thereby driving the spherical aberration correction mechanism in the optical pickup 1.

The servo circuit 11 is also adapted to set a focus bias. More specifically, the servo circuit 11 applies the focus bias specified by the system controller 10 to the focus servo loop.

The spindle servo circuit 12 controls the spindle motor 2 so as to rotate at a CLV.

More specifically, if the spindle servo circuit 12 acquires, from the data signal processing circuit 5, the clock signal indicating the current rotation speed of the spindle motor 2, the spindle servo circuit 12 compares the current rotation speed with a reference CLV value and produces a spindle error signal corresponding to the difference between them.

In the case where the optical disk D is of the recordable type, the clock signal produced in the PLL process on the wobble signal may be used as rotation speed information indicating the current rotation speed of the spindle motor 2, and a spindle error signal may be produced by comparing the rotation speed information with the reference CLV value.

The spindle servo circuit 12 produces a spindle drive signal based on the spindle error signal and supplies the resultant spindle drive signal to the spindle driver 16. In accordance with the supplied spindle drive signal, the spindle driver 16 drives the spindle motor 2 so as to rotate at a CLV.

The spindle servo circuit 12 also generates spindle drive signal in accordance with a spindle kick/brake control signal supplied from the system controller 10 to start, stop, accelerate, or decelerate the spindle motor 2.

The servo control operation and the reading operation described above are controlled by the system controller 10 implemented by a microcomputer.

The system controller 10 performs various processes in accordance with commands given by the host device 100 via the host interface 8.

For example, if a read command to read data from the optical disk D and transfer it to the host device 100 is issued by the host device 100, the system controller 10 first performs a seek operation to seek a specified address. More specifically, the system controller 10 sends a seek command to the servo circuit 11 to move the optical pickup 1 to access the address specified by the seek command.

Next, the system controller 10 controls the operation to transfer the specified data to the host device 100. More specifically, the system controller 10 controls the data signal processing circuit 5 and the decoder 7 to read a specified signal from the optical disk D and transfer the data to the host device 10.

In the embodiment described above with reference to FIG. 1, the optical recording medium drive apparatus is assumed to be a disk drive connected to the host device 100. The optical recording medium drive apparatus may be an apparatus configured not to be connected to an external device. In this case, the data input/output interface of the optical recording medium drive apparatus may be configured differently from that shown in FIG. 1. For example, the optical recording medium drive apparatus may additionally include an operation unit and a display so that a recording/reading operation can be performed in accordance with a command issued via the operation unit by a user.

The optical recording medium drive apparatus may be configured further differently in various manners. For example, the optical recording medium drive apparatus may have a recording function. That is, the optical recording medium drive apparatus may be embodiment in the form of a recording/reading apparatus or a recording apparatus.

The disk drive having the above-described configuration according to the first embodiment is capable of detecting the number of recording layers of the optical disk D.

In particular, when a BD is mounted as the optical disk D, the disk drive detects whether the BD is of the SL type or the DL type.

As described above, the optical disk D has data indicating physical properties of the disk including the number of recording layers. Thus, the detection of the number of recording layers can be performed by reading the physical property information.

To read data from the optical disk D, it is required that the focus servo control and the tracking servo control are working successfully. It takes a considerably long time to start the servo control operation, and thus it takes a correspondingly long time to detect the number of layers from the physical property information.

In the present embodiment, to avoid the above problem with the delay caused by the long time needed to start the focus servo control operation and the tracking servo control operation, the number of layer is detected from a reflected light signal obtained when the objective lens is driven in the focusing direction.

The determination of the number of layers based on the reflected light signal obtained from the optical disk D when the objective lens is driven in the focusing direction can be performed, for example, as follows.

Figure 2A:
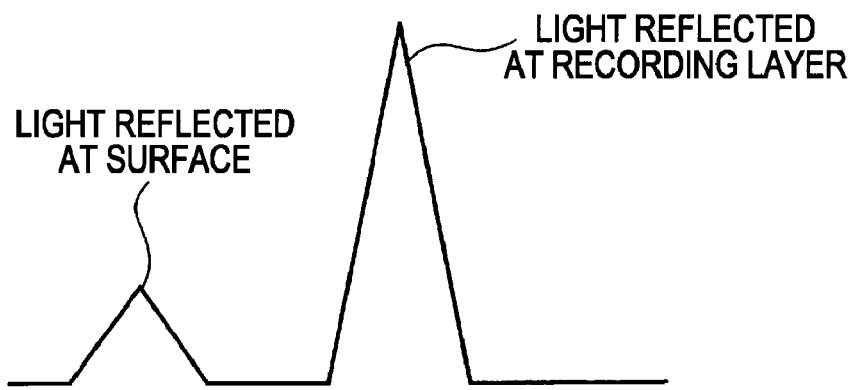
FIGS. 2A and 2B illustrate patterns of a signal of light reflected from an optical recording medium, obtained when an objective lens is driven in a focusing direction.
Figure 2B:
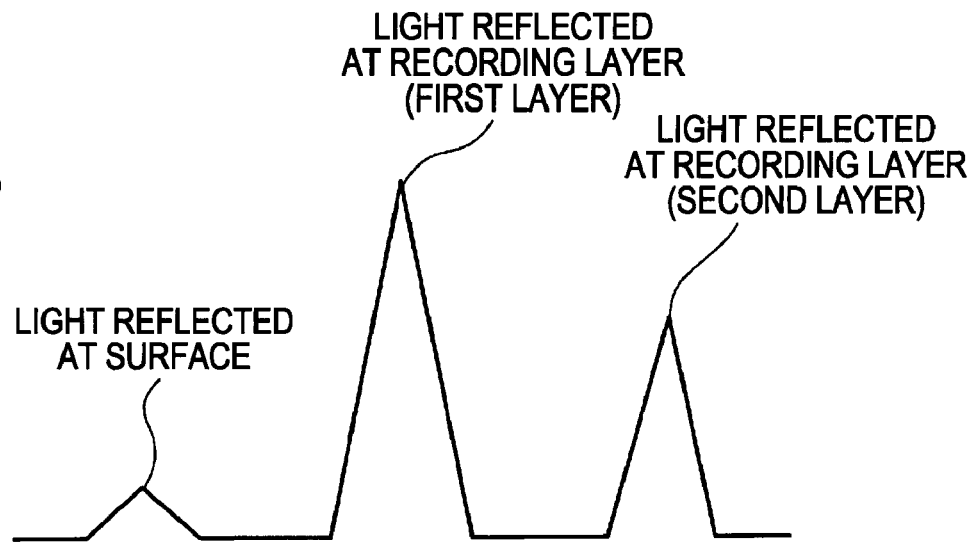

FIGS. 2A and 2B illustrate patterns of the reflected light signal obtained when the objective lens is driven in the focusing direction.

If the optical disk has a single recording layer, the reflected light signal has two peaks (turning points) one of which occurs when light is reflected at the surface of the disk, and the other one of which occurs when the light is reflected at the recording layer, as is shown in FIG. 2A. If the optical disk has two recording layers, the reflected light signal has three peaks respectively corresponding to reflection at the surface of the disc, reflection at a first recording layer, and reflection at a second recording layer, as is shown in FIG. 2B.

Thus, when the objective lens is driven in the focusing direction, if the reflected light signal has only two peaks, it is determined that the optical disk is of the single layer type, while it is determined that the optical disk is of the dual layer type if the reflected light signal has three peaks.

However, in the case where the optical pickup 1 has the three-wavelength single-lens configuration as is the case with the present embodiment, noise included in the reflected light signal can cause an error in the detection of the number of layers. This problem is serious in particular when the optical disk is a BD.

FIG. 3 illustrates an example of a reflected light signal detected by the three-wavelength single-lens pickup in the detection of the number of layers of a BD. In this example, the reflected light signal is obtained (for example, as the pull-in signal or the focus error signal) when a BD of the SL (Single Layer) type is illuminated with a laser beam.

As shown in FIG. 3, when the BD of the SL type is illuminated with the laser beam emitted from the three-wavelength single-lens pickup, the reflected light can include, in addition to peaks corresponding to reflection at the surface of the disk and reflection at the recording layer, a noise peak occurring before a peak due to the reflection at the surface of the disk, a noise peak occurring in the peak due to the reflection at the surface of the disk, and a noise peak occurring after the peak due to the reflection at the surface of the disk.

It is known that these noise peaks appear before, in, and after the peak due to the reflection at the surface of the disk, but exact locations of the noise peaks varies depending on the characteristics of the disk and/or the characteristics of the pickup. In some cases, no noise peaks appear.

Noise peaks originate from reflection of light from a recording layer. Therefore, noise peaks appearing in the BD of the dual layer type are more complicated than the noise peaks appearing in the BD of the signal layer type shown in FIG. 3.

Occurrences of noise peaks at locations different from locations at which intrinsic peaks appear make it difficult to correctly detect the number of layers using the method based on the reflected light signal.

If the detection of the number of layers based on the reflected light signal fails, it is necessary to read the physical property information recorded on the optical disk D while controlling focusing and tracking by using the servo control method. In this case, as described above, a long detection time is needed.

Because complicated noise peaks appear in the BD of the DL type, it is difficult to correctly determine the BD is of the DL type as a BD of the DL type from the reflected light signal obtained for the BD of the DL type. Fortunately, at present, there are only two types, i.e., the SL (Single Layer) type and the DL (Dual Layer) type in BDs. Therefore, in the present embodiment, a high-reliability determination is made as to whether the given BD is of the SL type which generates a simple noise peak pattern, and if the determination indicates that the given BD is not of the SL type, then it is determined that the given BD is of the DL type.

Figure 4A:
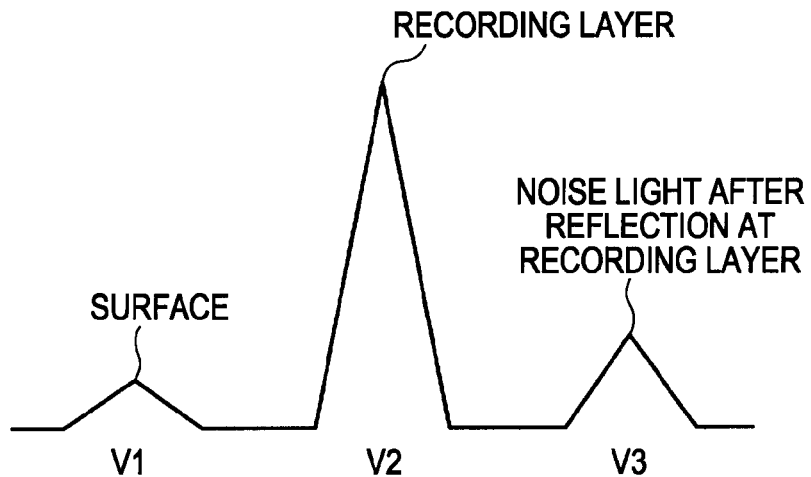
FIGS. 4A to 4C illustrate examples of patterns of peaks of a reflected light signal, which can occur when an optical recording medium is of a single layer type (a pattern having no noise peak is also possible although not shown)
Figure 4B:
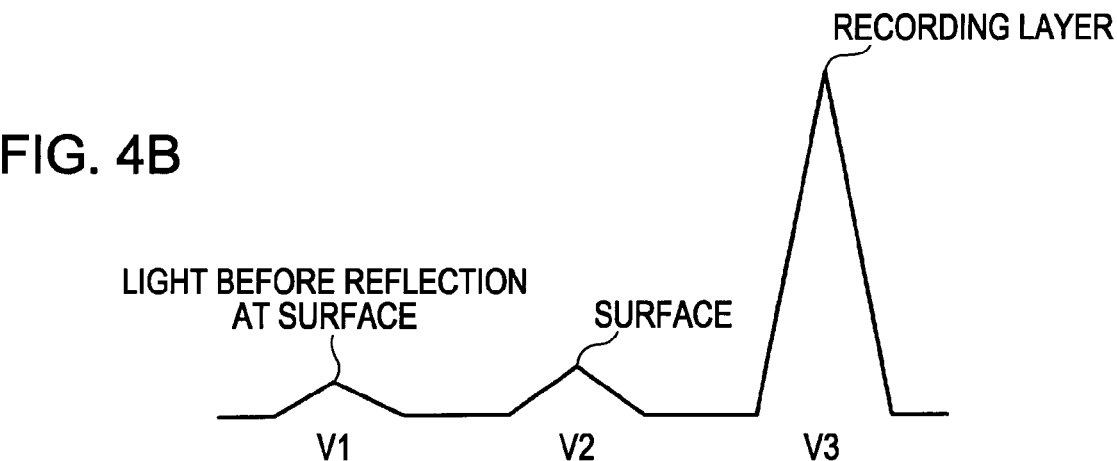
Figure 4C:
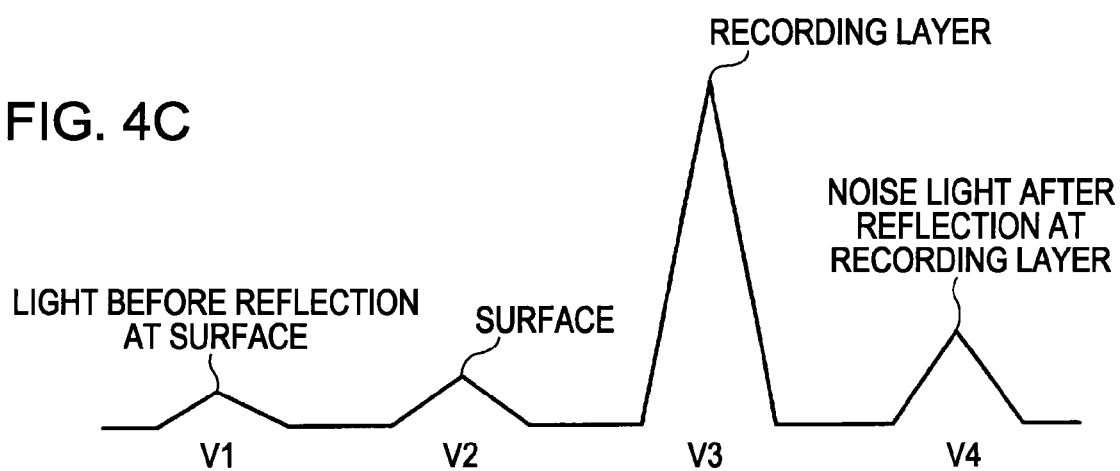

FIGS. 4A, 4B, and 4C illustrates three typical reflected light signal patterns including noise peaks, for the BD of the SL type. In these figures, it is assumed that the reflected light signals are pull-in signals PI (or focus error signals FE) obtained during the process in which the objective lens is driven in the focusing direction.

In the example shown in FIG. 4A, the reflected light signal includes a peak due to reflection at the surface of the disk, a peak due to reflection at the recording layer, and a noise peak appearing after the peak due to reflection at the recording layer. In the example shown in FIG. 4B, the reflected light signal includes a noise peak appearing before a peak due to reflection at the surface of the disk, the peak due to reflection at the surface of the disk, and a peak due to reflection at the recording layer. In the example shown in FIG. 4C, the reflected light signal includes a noise peak appearing before a peak due to reflection at the surface of the disk, the peak due to reflection at the surface of the disk, a peak due to reflection at the recording layer, and a noise peak appearing after the peak due to reflection at the recording layer.

Note that in some cases, the reflected light signal includes no noise peaks such as those shown in FIGS. 4A to 4C, but the reflected light signal includes only two peaks on of which is due to reflection at the surface of the disk and the other one of which is due to reflection at the recording layer (as shown in FIG. 2A).

Thus, there are a total of four patterns in the reflected light signal for the BD of the SL type, including the pattern having no noise peaks.

Note that in the examples shown in FIGS. 4A to 4C, noise peaks appearing in peaks due to reflection at the surface of the disk such as that shown in FIG. 3 are not shown. Such a noise peak appears at a location very close to an intrinsic peak due to reflection at the surface of the disk, and there is substantially no possibility that the disk drive detects such a noise peak separately from an intrinsic peak. Therefore, a particular consideration for such a noise peak is needed in the analysis of the reflected light signal. Thus, the reflected light signal has substantially four patterns.

Thus, the determination as to whether the given BD is of the SL type is made by determining whether any one of the four patterns shown in FIG. 4 is detected in the reflected light signal obtained when the objective lens is driven in the focusing direction.

That is, if the reflected light signal has any one of the four patterns, it is correctly determined that the BD is of the SL type, and thus it is possible to correctly determine whether the given BD is of the SL (Single Layer) type or the DL (Dual Layer) type.

In the present embodiment, the determination as to whether the peak pattern of the reflected light signal is similar to any one of the four patterns is made by using the difference in signal level among the peak due to reflection at the recording layer, the peak due to reflection at the surface of the disk, and the noise peak.

The reflectivity of the recording layer of the BD varies depending on the type of the BD. More specifically, according to the specifications, the first recording layer located close to the surface from which the laser beam incident has a reflectivity of 35% to 70% for BD-RO (BD of the read only type) and 12% to 24% for BD-R/RE (BD of recordable types). That is, the reflectivity is in the range from 12% to 70%. In contrast, the noise peaks and peaks due to reflection at the surface of the disk shown in FIGS. 4A to 4C have signal levels corresponding to reflectivities in the range of 4% to 5%.

This means that signal levels of noise peaks and the peak due to reflection at the surface of the disk are less than one-half the signal level of peak due to reflection at the recording layer. Therefore, any peak with a level lower than the one-half the level of the peak due to reflection at the recording layer can be regarded as a noise peak or a peak due to refection at the surface of the disk.

A specific example of the process of detecting the number of layers according to the present embodiment is described below. Note that the process described below is performed mainly by the system controller 10.

In the process of detecting the number of layers, first, in a state in which the tracking servo control operation and the focus servo control operation are not performed, the mounted optical disk D is illuminated with the laser beam and the pull-in signal PI obtained when the objective lens is driven in the focusing direction is input to the matrix circuit 4. Peaks included in the pull-in signal PI and amplitudes thereof are detected, and information associated with the peaks is stored. Furthermore, the number of peaks and the level of each level are detected.

If the detected number of peaks is equal to 2, it is determined that the pull-in signal PI has only a peak due to reflection at the surface of the disk and a peak due to reflection at the recording layer. Thus, in this case, it is determined that the mounted optical disk D is of the SL type.

In a case where the detected number of peaks, n, is equal to or greater than 3, as can be understood from FIG. 4, if n=3 or 4, there is a possibility that the mounted optical disk D is of the SL type. In other words, if the number of peaks, n, is equal to or greater than 5, the mounted optical disk D cannot be of the SL type, that is, the mounted optical disk D is of the DL type.

Thus, when the detected number of peaks, n, is equal to or greater than 3, a further determination is made as to whether the number of peaks, n, is equal to or greater than 5, and if it is determined that n≧5, it is determined that the mounted optical disk D is of the DL type.

On the other hand, in the case where the number of layer, n, is equal to 3 or 4, there is a possibility that the pull-in signal PI has a pattern similar to one of the patterns shown in FIG. 4. This can occur when the pull-in signal PI includes, in addition to a peak due to reflection at the surface of the disk and a peak due to reflection at the recording layer, one or both of a noise peak appearing after the peak due to reflection at the recording layer (FIG. 4A) and a noise peak appearing before the peak due to reflection at the surface of the disk.

First, it is determined that the pull-in signal PI has a pattern similar to that shown in FIG. 4B in which a noise peak appearing before the peak due to reflection at the surface of the disk appears as the only additional peak. As described above, even in the highest case, the amplitudes of the noise peak cannot be greater than one-half the amplitude of the peak due to reflection at the surface of the recording layer. Thus, to determine whether the pull-in signal PI has a peak appearing before the peak due to reflection at the surface of the disk, a determination is made as to whether the amplitude (V1) of the peak at the first location and the amplitude (V2) of the peak at the second location following the first location are smaller than one-half the amplitude (V3) of the peak at the third location following the second location. That is, a determination is made as to whether $V3/V1 \geq 2$ and $V3/V2 \geq 2$, and if the result of the determination is affirmative, it is determined that the pull-in signal PI has a peak appearing before the peak due to reflection at the surface of the disk.

When the pull-in signal PI is determined to have a peak appearing before the peak due to reflection at the surface of the disk, if the number of peaks is equal to 3, it is determined that the pull-in signal Pi has the pattern shown in FIG. 4B. That is, when it is determined that $V3/V1 \geq 2$ and $V3/V2 \geq 2$, a determination is further made as to whether the number of layer, n, is equal to 3, and if the result indicates that n=3, it is determined that the optical disk D is of the SL type.

On the other hand, in the case where it is determined that n≠3, the number of layer, n, is equal to 4. In this case, if the optical disk D is of the SL type, the only possible pattern is that shown in FIG. 4C. If the peak at the fourth location is a noise peak appearing after the peak due to reflection at the recording layer, the pattern is similar to that shown in FIG. 4C.

The determination whether this is the case is made as follows. At this stage, it has already been determined that the pull-in signal PI has the noise peak appearing before the peak due to reflection at the surface of the disk, and thus it has already been determined that the peak at the first location is the noise peak appearing before the peak due to reflection at the surface of the disk, the peak at the second location is the peak due to reflection at the surface of the disk, and the peak at the third location is the peak due to reflection at the recording layer. In this case, it is possible to determine whether the peak at the fourth location is a noise peak appearing after the peak due to reflection at the recording layer by determining whether the amplitude V4 of the peak at the fourth location is equal to or smaller than one-half the amplitude V3 of the peak at the third location. That is, the determination as to whether the pull-in signal PI has the same pattern as that shown in FIG. 4C can be made by determining whether the amplitude V4 of the peak at the fourth location is equal to or smaller than one-half the amplitude V3 of the peak at the third location.

Thus, it is determined whether $V3/V4 \geq 2$. If the determination result indicates that $V3/V4 \geq 2$, it is determined that the optical disk D is of the SL type.

If the result of the determination as to whether $V3/V4 \geq 2$ is negative, the peak at the fourth location must be a peak due to reflection at the recording layer. In this case, the pull-in signal PI has two peaks due to reflection at recording layers, and thus it is determined that the optical disk D is of the DL type.

In the case where the result of the determination as to whether $V3/V1 \geq 2$ and $V3/V2 \geq 2$ is negative, the pull-in signal PI includes no noise peak appearing before the peak due to reflection at the surface of the disk. In this case, a further determination is made as to whether the number of peaks, n, is equal to 3. If it is determined that the number of peaks, n, is not equal to 3, the number of layer, n, must be equal to 4 and the pull-in signal PI includes no noise peak appearing before the peak due to reflection at the surface of the disk. This means that the pattern of the pull-in signal PI is not similar to any of the patterns shown in FIGS. 4A to 4C. Thus, when it is determined that the number of peaks, n, is not equal to 3, it is determined that the optical disk is of the DL type.

When n=3, the optical disk D can be of the SL type only when the pull-in signal PI has the pattern shown in FIG. 4A. Because it has already been determined that the pull-in signal PI includes no noise peak appearing before the peak due to reflection at the surface of the disk, it can be determined that the peak at the first location is the peak due to reflection at the surface of the disk, and the peak at the second location is the peak due to reflection at the recording layer. This means that it is possible to determine whether the pull-in signal PI has the pattern shown in FIG. 4A by determining whether the peak at the third location is a noise peak appearing after the peak due to reflection at the recording layer or a peak due to reflection at another recording layer.

Thus, when n=3, a determination is made as to whether the amplitude V3 of the peak at the third location is equal to or smaller than one-half the amplitude V2 of the peak at the second location. If it is determined that $V2/V3 \geq 2$, it is determined that the pull-in signal PI has the pattern shown in FIG. 4A, and thus the optical disk D is of the SL type.

On the other hand, the result of the determination as to whether $V2/V3 \geq 2$ is negative, the peak at the third location cannot be a noise peak but must be a peak due to reflection at another recording layer, and thus the optical disk D must be of the DL type.

In the present embodiment, as described above, the pull-in signal PI detected when the objective lens is driven in the focusing direction is examined to determine whether the pull-in signal PI has any one of the patterns shown in FIGS. 4A to 4C which can occur for the BD of the SL type. This makes it possible to detect a BD is of the SL type correctly as a BD of the SL type and thus it is possible to correctly determine whether the given BD is of the SL type or of the DL type.

In the present embodiment, as described above, the determination of the number of layers is made based on the fact that peaks due to reflection at recording layers have an amplitude different from amplitudes of noise peaks and a peak due to reflection at the surface of the disk. More specifically, the determination is made by checking whether the number of peaks and the difference in amplitude among peaks satisfy the criterion predefined for the BD of the single layer type in terms of the number of layers and the difference in amplitude among peaks. This makes it possible to detect a BD is of the SL type correctly as a BD of the SL type and thus it is possible to correctly determine whether the given BD is of the SL type or of the DL type.

In the present embodiment, as described above, the determination of the number of layers can be made simply by examining the reflected signal such as the pull-in signal PI obtained when the objective lens is driven in the focusing direction, without having to read the physical property information indicating the number of layers from the optical disk D in a state in which the focus servo control operation and the tracking servo control operation are being performed. This allows a great improvement in the speed of detecting the number of layers.

The determination of the number of layer according to the present embodiment can be made on the basis of peaks detected in a reflected light signal, such as the pull-in signal PI, or the focus error signal FE, output from a photodetector widely used to read a signal (data). Thus, in the present embodiment of the invention, unlike the technique disclosed in Japanese Unexamined Patent Application Publication No. 2006-155791, it is not necessary to dispose a special photodetector for detecting the number of layers in addition to the photodector for reading the signal. This allows the optical recording medium drive apparatus to be configured in a simple form and allows a reduction in cost.

Figure 5:
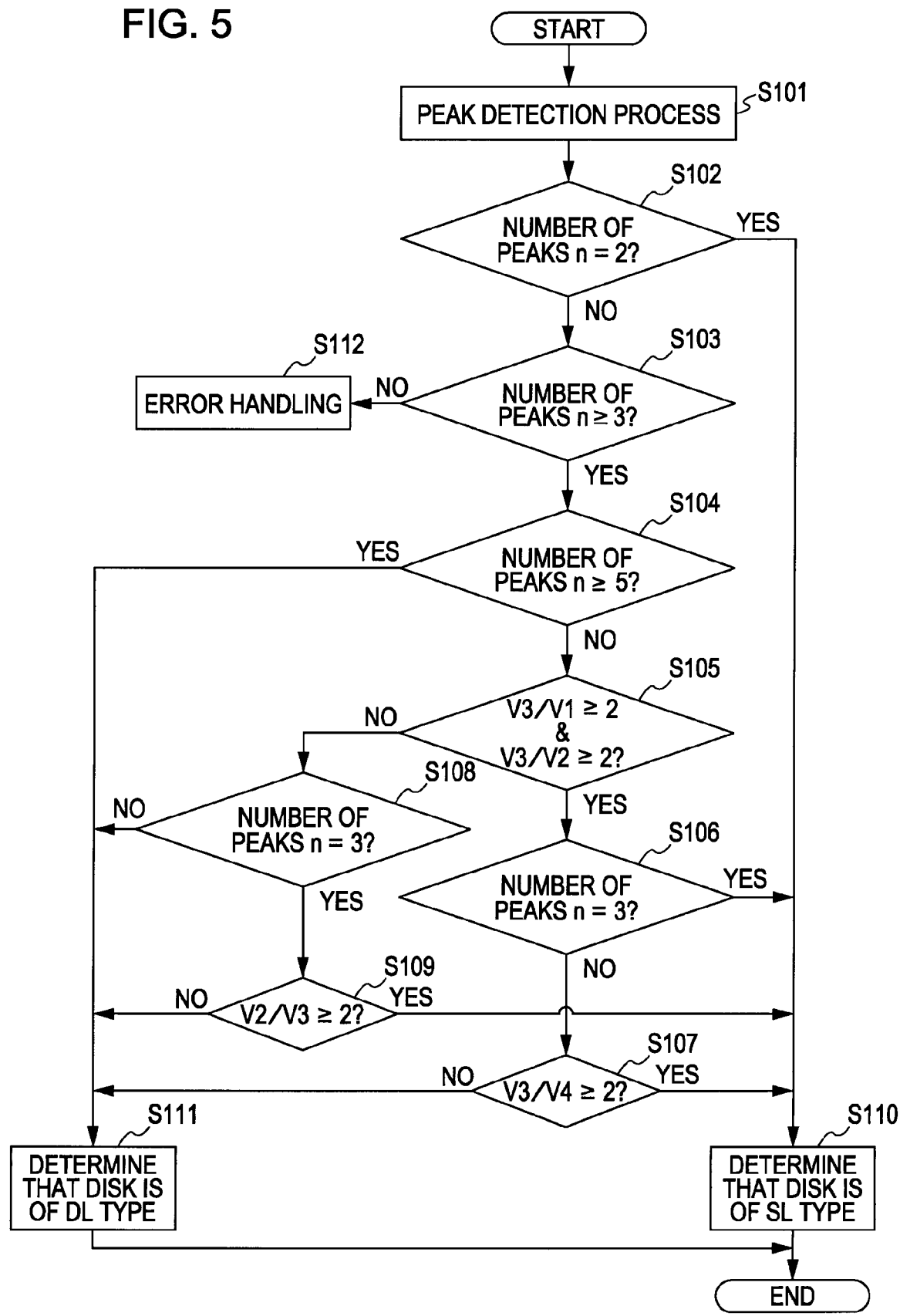
FIG. 5 is a flow chart associated with a process of determining the number of layers according to an embodiment of the present invention.

Referring to a flow chart shown in FIG. 5, the process of determining the number of layers according to the present embodiment of the present invention is described in further detail below. The process shown in FIG. 5 is performed by the system controller 10 in accordance with a program stored in a ROM or a similar memory.

First, in step S101, peaks included in the pull-in signal PI are detected. More specifically, the mounted optical disk D is illuminated with the laser beam emitted from the optical pickup 1 in a state in which the tracking servo control operation and the focus servo control operation are not performed. In this state, the servo circuit 11 controls the objective lens so as to move in the focusing direction, and an obtained pull-in signal PI is input to the matrix circuit 4. Peaks included in the pull-in signal PI and amplitudes thereof are detected, and information associated with the peaks is stored.

Next, in step S102, a determination is made as to whether the number of peaks, n, is equal to 2. If it is determined that n=2, the process proceeds to step S110. In step S110, it is determined that the optical disk D of the SL type.

On the other hand, in the case where the result of the determination in step S102 as to whether n=2 is negative, the process proceeds to step S103. In step S103, a determination is made as to whether the number of peaks, n, is equal to or greater than 3 (that is, whether $n \geq 3$).

If the result of the determination as to whether $n \geq 3$ is negative, the number of peaks must be equal to 1. However, this is contradictory. Thus, when the result of the determination in step S103 is negative, the process proceeds to step S112 to perform an error handling process.

In the case where the result of the determination in step S103 as to whether $n \geq 3$ is affirmative, the process proceeds to step S104. In step S104, a further determination is made as to whether the number of peaks, n, is equal to or greater than 5 (that is, whether $n \geq 5$).

In a case where the result of the determination in step S104 as to whether $n \geq 5$ is affirmative, the process proceeds to step S111. In step S111, it is determined that the optical disk D is of the DL type.

On the other hand, in a case where the result of the determination in step S104 as to whether $n \geq 5$ is negative, the process proceeds to step S105. In step S105, a determination is made as to whether the amplitude V1 of the peak at the first location and the amplitude V2 of the peak at the second location are equal to or smaller than one-half the amplitude V3 of the peak at the third location, that is, as to whether $V3/V1 \geq 2$ and $V3/V2 \geq 2$.

If the result of the determination as to whether $V3/V1 \geq 2$ and $V3/V2 \geq 2$ is affirmative, that is, if the amplitude V1 of the peak at the first location and the amplitude V2 of the peak at the second location are both equal to or smaller than one-half the amplitude V3 of the peak at the third location, it is determined that the pull-in signal PI includes a noise peak appearing before a peak due to reflection at the surface of the disk. In this case, the process proceeds to step S106 to make a further determination as to whether the number of peaks, n, is equal to 3 (that is, whether n=3) to determine whether the pull-in signal PI has the pattern shown in FIG. 4B.

If the result of the determination in step S106 as to whether n=3 is affirmative, that is, if n=3, the process proceeds to step S110. In step S110, it is determined that the optical disk D is of the SL type.

On the other hand, if the result of the determination in step S106 as to whether n=3 is negative, that is, if n is not equal to 3, the process proceeds to step S107. In step S107, a determination is made as to whether the amplitude V4 of a peak at the fourth location is equal to or smaller than one-half the amplitude V3 of the peak at the third location, that is, whether V3/V4≧2.

By step S107, it has already been determined that the pull-in signal PI includes the noise peak appearing before the peak due to reflection at the surface of the disk and the number of peaks, n, is equal to 4. In this situation, if the optical disk D is of the SL type, the only possible pattern for the pull-in signal PI is that shown in FIG. 4C. Thus, it is confirmed whether the pull-in signal PI has the pattern shown in FIG. 4C by making the above-described check in step S107 as to whether the peak at the fourth location is a noise peak appearing after the peak due to reflection at the recording layer.

If the determination in step S107 as to whether V3/V4≧2 is affirmative, that is, if it is determined that V4 is equal to or smaller than one half of V3, it is determined that the peak at the fourth location is a noise peak appearing after the peak due to reflection at the recording layer. In this case, the process proceeds to step S110 and it is determined that the optical disk D is of the SL type.

On the other hand, if the determination in step S107 as to whether V3/V4≧2 is negative, that is, if it is determined that V4 is greater than one half of V3, it is determined that the peak at the fourth location is not a noise peak appearing after the peak due to reflection at the recording layer but a peak due to reflection at a recording layer. In this case, the process proceeds to step S111 and it is determined that the optical disk D is of the DL type.

In a case where the determination in step S105 as to whether V3/V1≧2 and V3/V2≧2 is negative, that is, if it is determined that the pull-in signal PI includes no noise peak appearing before the peak due to reflection at the surface of the disk, the process proceeds to step S108. In step S108, a further determination is made as to whether the number of layer, n, is equal to 3 (that is, whether n=3).

If the result of the determination in step S108 as to whether n=3 is negative, that is, if n is not equal to 3, the number of layer, n, must be equal to 4 and the pull-in signal PI includes no noise peak appearing before the peak due to reflection at the surface of the disk. This means that the pattern of the pull-in signal PI is not similar to any of the patterns shown in FIGS. 4A to 4C. Thus, if the determination in step S108 is negative, the process proceeds to step S111 and it is determined that the optical disk D is of the DL type.

On the other hand, if the determination in step S108 is affirmative, that is, if n=3, the process proceeds to step S109. In step S109, a determination is made as to whether the amplitude V3 of the peak at the third location is equal to or smaller than one-half the amplitude V2 of the peak at the second location, that is, a determination is made as to whether V2/V3≧2.

By step S109, it has already been determined that the pull-in signal PI includes no noise peak appearing before the peak due to reflection at the surface of the disk, and thus it has already been determined that the peak at the first location is the peak due to reflection at the surface of the disk, and the peak at the second location is the peak due to reflection at the recording layer. Furthermore, in the determination in step S108, it has already been determined that the number of peaks, n, is equal to 3. In this situation, the only possible pattern the pull-in signal PI can have is that shown in FIG. 4A. Thus, it is confirmed whether the peak at the third location is a noise peak appearing after the peak due to reflection at the recording layer, that is, it is confirmed whether the pull-in signal PI has the pattern shown in FIG. 4A, by making the above-described check in step S109 as to whether the amplitude V3 of the peak at the third location is equal to or smaller than one-half the amplitude V2 of the peak at the second location.

If the determination in step S109 as to whether V2/V3≧2 is affirmative, that is, if V3 is equal to or smaller than one half of V2, it is determined that the peak at the third location is a noise peak appearing after the peak due to reflection at the recording layer. In this case, the process proceeds to step S110 and it is determined that the optical disk D is of the SL type.

On the other hand, if the determination in step S109 as to whether V2/V3≧2 is negative, that is, if V3 is greater than one half of V2, it is determined that the peak at the third location is a peak due to reflection at a recording layer. In this case, the process proceeds to step S111 and it is determined that the optical disk D is of the DL type.

In the above-described method based on the difference in amplitude between peaks due to reflection at recording layers and noise peaks or peaks due to reflection at the surface of the disk, the determination is made by checking whether the number of peaks detected in the reflected light signal and the difference in amplitude among peaks satisfy the criterion predefined for the optical disk of the single layer type in terms of the number of peaks and the difference in amplitude among peaks, such as those shown in FIG. 4.

The determination as to whether the number of peaks detected in a reflected light signal and amplitudes of respective peaks satisfy the criteria predefined for the optical disk D of the signal layer type can be made by an alternative method based on the first embodiment.

Also in this alternative method based on the first embodiment, first, the pull-in signal PI is analyzed to detect peaks, the number of peaks, and the amplitude of each peak.

A determination is then made as to whether the number of peaks, n, is equal to 2. If n=2, it is determined that the optical disk D is of the SL type. If n is not equal to 2, a further determination is made as to whether n≧3. If the determination as to whether n≧3 is negative, an error handling process is performed.

If n≧3, a determination is made as to whether the amplitude V3 of the peak at the third location is equal to or smaller than one-half the amplitude V2 of the peak at the second location, that is, whether V2/V3≧2, to determine whether the pull-in signal PI includes no noise peak appearing before the peak due to reflection at the surface of the disk but includes a noise peak appearing after the peak due to reflection at the recording layer.

When the pull-in signal PI includes no noise peak appearing before the peak due to reflection at the surface of the disk but includes a noise peak appearing after the peak due to reflection at the recording layer as in the pattern shown in FIG. 4A, V3 must be equal to or smaller than V2. Thus, the above described determination is made to check whether this is the case.

In this case, the pull-in signal PI includes no noise peak appearing before the peak due to reflection at the surface of the disk, and the peak appearing first must be a peak due to reflection at the surface of the disk. Therefore, if V3 is equal to or smaller than one half of V2, it can be determined that the peak at the second location is a peak due to reflection at the recording layer. When V3 is equal to or smaller than one half of V2, it can also be determined that the peak at the third location is a noise peak appearing after the peak due to reflection at the recording layer. Thus, by checking whether V2/V3≧2, it is possible to determine whether the pull-in signal PI includes no noise peak appearing before the peak due to reflection at the surface of the disk but includes a noise peak appearing after the peak due to reflection at the recording layer.

If it is determined that V2/V3≧2 and thus it is determined that the pull-in signal PI includes no noise peak appearing before the peak due to reflection at the surface of the disk but includes a noise peak appearing after the peak due to reflection at the recording layer, a further determination is made as to whether the number of peaks, n, is equal to 3. If n=3, the pull-in signal PI has the pattern shown in FIG. 4A, and thus it is determined that the optical disk D is of the SL type.

On the other hand, in the case where it is determined that n≠3, the pull-in signal PI includes a fourth peak in addition to those included in the pattern shown in FIG. 4A, and thus the optical disk D cannot be of the SL type. Thus, in this case, it is determined that the optical disk D is of the DL type.

On the other hand, the determination as to whether V2/V3≧2 is negative, and thus it is not the case where the pull-in signal PI includes no noise peak appearing before the peak due to reflection at the surface of the disk but includes a noise peak appearing after the peak due to reflection at the recording layer, a determination is made as to whether the pull-in signal PI includes a noise peak appearing before the peak due to reflection at the surface of the disk, as in the pattern shown in FIG. 4B or 4C.

More specifically, a determination is made as to whether the amplitude V1 of the peak at the first location and the amplitude V2 of the peak at the second location are both equal to or smaller than one-half the amplitude V3 of the peak at the third location, that is, a determination is made as to whether V3/V1≧2 and V3/V2≧2. If this determination is affirmative, it can be determined that the peak at the third location is a peak due to reflection at the recording layer, and the peaks at the first and second location are not due to reflection at the recording layer. In this case, one of the first and second peak must be a peak due to reflection at the surface of the disk and the other must be a noise peak appearing before peak due to reflection at the surface of the disk. Thus, it is determined that the peak at the first location is the noise peak appearing before the peak due to reflection at the surface of the disk, and the peak at the second location is the peak due to reflection at the surface of the disk, and thus there is a possibility that the pull-in signal PI has one of patterns shown in FIGS. 4B and 4C.

If the determination is negative as to whether V3/V1≧2 and V3/V2≧2, that is, if V1 and V2 are not both equal to or smaller than one half of V3, the pattern of the pull-in signal PI is not similar to any of the patterns shown in FIGS. 4A to 4C, and it is determined that the optical disk D is of the DL type.

On the other hand, if the determination that V3/V1≧2 and V3/V2≧2, that is, if V1 and V2 are both equal to or smaller than one half of V3, a determination is further made as to whether the number of layer, n, is equal to 3. If n=3, it is determined that the pull-in signal PI has the pattern shown in FIG. 4B, and thus it is determined that the optical disk D is of the SL type.

On the other hand, in the case where it is determined that n≠3, a determination is made as to whether the pull-in signal PI has the pattern shown in FIG. 4C. That is, a determination is made as to whether the amplitude V4 of a peak at the fourth location is equal to or smaller than one-half the amplitude V3 of the peak at the third location, thereby determining whether the peak at the fourth location is a noise peak appearing after the peak due to reflection at the recording layer.

If the determination as to whether V3/V4≧2 is negative, that is, if V4 is greater than one half of V3, it is determined that the peak at the fourth location is a peak due to reflection at another recording layer, and thus it is determined that the optical disk D is of the DL type.

On the other hand, if V3/V4≧2, that is, if V4 is equal to or smaller than one half of V3, it is determined that there is a possibility that the pill-in signal PI has the pattern shown in FIG. 4C.

Thus, a further determination is made as to whether the number of peaks, n, is equal to 4. If n=4, the pull-in signal PI has the pattern shown in FIG. 4C, and thus it is determined that the optical disk D is of the SL type. If n≠4, the pattern of the pull-in signal PI is not similar to any of the patterns shown in FIGS. 4A to 4C, and thus it is determined that the optical disk D is of the DL type.

Figure 6:
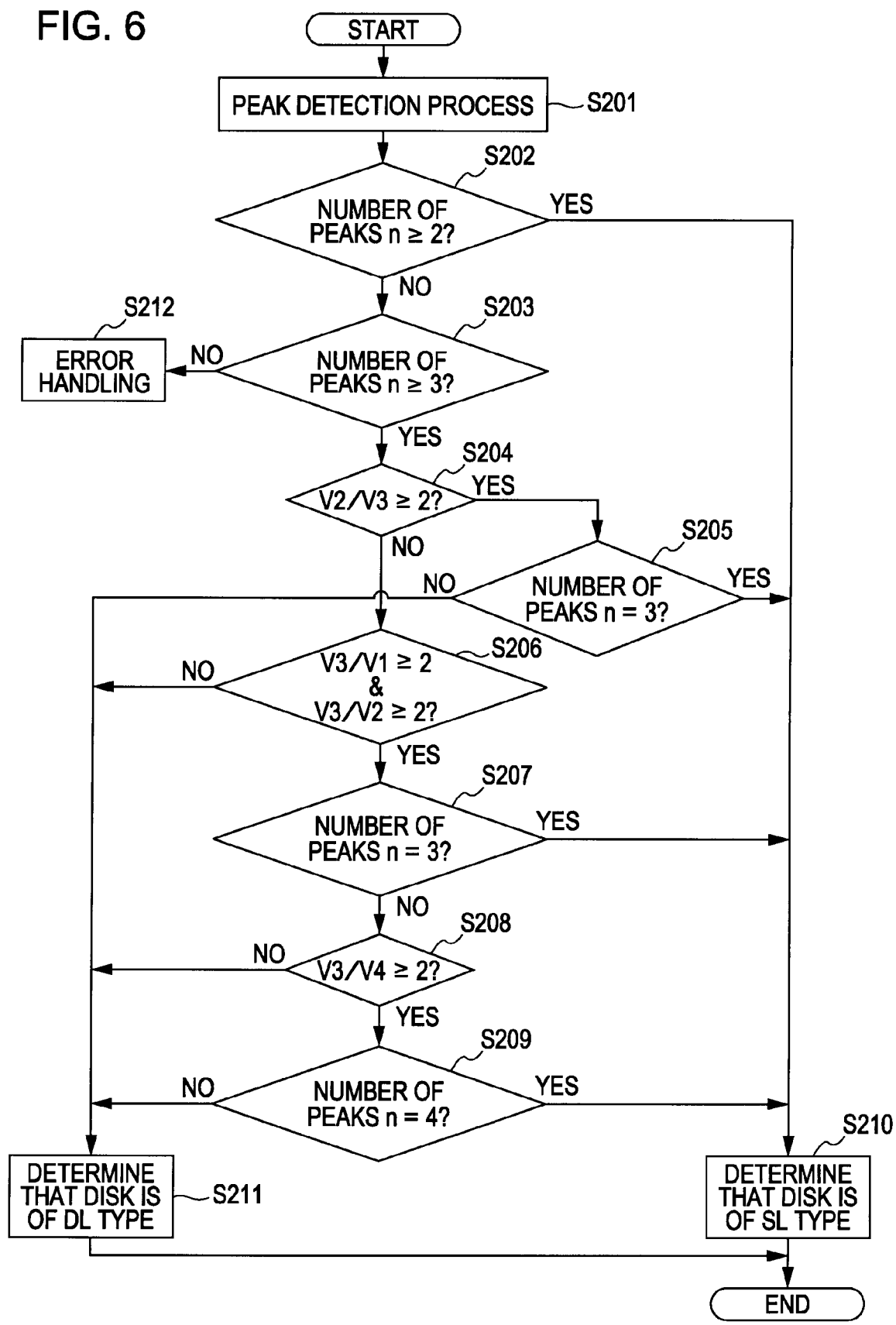
FIG. 6 is a flow chart associated with a process of determining the number of layers according to an embodiment of the present invention.

FIG. 6 illustrates a processing flow of the operation according to the modification of the first embodiment described above. The operation shown in FIG. 6 is performed by the system controller 10 in accordance with a program stored in an internal memory.

Detection of peaks included in the pull-in signal PI in step S202, a determination in step S202 as to whether n=2, and a determination in step S203 as to whether n≧3 are performed in similar manners to steps S101, S102, and S103 described above with reference to FIG. 5. If the determination in step S202 is affirmative, the process proceeds to step S210. In step S210, it is determined that the optical disk D is of the SL type. On the other hand, if the determination in step S203 as to whether n≧3 is negative, n must be equal to 1, but this is contradictory. In this case, the process proceeds to step S212 to perform an error handling process in a similar manner to step S112.

In the case where the determination in step S203 as to whether n≧3 is affirmative, the process proceeds to step S204. In step S204, a determination is made as to whether the amplitude V3 of a peak at the third location is equal to or smaller than one-half the amplitude V2 of the peak at the second location, that is, a determination is made as to whether V2/V3≧2.

If it is determined that V2/V3≧2, that is, if V3 is equal to or smaller than one half of V2, the process proceeds to step S205 to make a further determination as to whether the number of peaks, n, is equal to 3 (that is, whether n=3).

If the determination in step S205 as to whether n=3 is affirmative, that is, if n=3, it is determined that the pull-in signal PI has the pattern shown in FIG. 4A. In this case, the process proceeds to step S210 and it is determined that the optical disk D is of the SL type.

On the other hand, if the determination in step S205 as to whether n=3 is negative, that is, if n≠3, the pull-in signal PI includes a fourth peak in addition to those included in the pattern shown in FIG. 4A, and thus the optical disk D cannot be of the SL type. Thus, in this case, the process proceeds to step S211 and it is determined that the optical disk D is of the DL type.

If the determination in step S204 as to whether V2/V3≧2 is negative, that is, if V3 is greater than one half of V2, the process proceeds to step S206. In step S206, a determination is made as to whether the amplitude V1 of the peak at the first location and the amplitude V2 of the peak at the second location are both equal to or smaller than one-half the amplitude V3 of the peak at the third location, that is, a determination is made as to whether V3/V1≧2 and V3/V2≧2.

If this determination is affirmative, there is a possibility that the pull-in signal PI has one of the patterns shown in FIGS. 4B and 4C.

If the determination in step S206 as to whether V3/V1≧2 and V3/V2≧2 is negative, that is, if V1 and V2 are not both equal to or smaller than one half of V3, the pattern of the pull-in signal PI is not similar to any of the patterns shown in FIGS. 4A to 4C. In this case, the process proceeds to step S211 and it is determined that the optical disk D is of the DL type.

On the other hand, if the determination as to whether V3/V1≧2 and V3/V2≧2 is affirmative, that is, if V1 and V2 are both equal to or smaller than one half of V3, the process proceeds to step S207 to make a further determination as to whether the number of peaks, n, is equal to 3 (that is, whether n=3). If n=3, it is determined that the pull-in signal PI has the pattern shown in FIG. 4B, and the process proceeds to step S210. In step S210, it is determined that the optical disk D is of the SL type.

If the determination in step S207 as to whether n=3 is negative, that is, if n is not equal to 3, the process proceeds to step S208. In step S208, a determination is made as to whether the amplitude V4 of a peak at the fourth location is equal to or smaller than one-half the amplitude V3 of the peak at the third location, that is, a determination is made as to whether V3/V4≧2.

If the determination as to whether V3/V4≧2 is negative, that is, if V4 is greater than one half of V3, it is determined that the peak at the fourth location is a peak due to reflection at another recording layer. Thus, in this case, the process proceeds to step S211 and it is determined that the optical disk D is of the DL type.

If the determination in step S208 as to whether V3/V4≧2 is affirmative, that is, if V4 is equal to or smaller than one half of V3, the process proceeds to step S209 to make a further determination as to whether the number of peaks, n, is equal to 4, that is, whether n=4. This determination is made to check whether the pull-in signal PI has the pattern shown in FIG. 4C.

If it is determined that n=4, the process proceeds to step S210 and it is determined that the optical disk D is of the SL type.

However, if it is determined that n≠4, the process proceeds to step S211 and it is determined that the optical disk D is of the DL type.

The method of determining whether the number of peaks detected in the reflected light signal and the difference in amplitude among peaks satisfy the criteria predefined in terms of patterns of peaks possible for the optical disk of the single layer type is not limited to the examples described above.

The method of determining the number of layers according to the first embodiment has been described above. Note that the process of determining the number of layers is not limited to specific examples described above.

For example, in the examples described above, the determination as to whether the pattern of peaks detected from the reflected light signal is similar to one of patterns including noise peaks which are possible for the optical disk of the single layer type is made by checking whether the number of peaks detected in the reflected light signal and the difference in amplitude among peaks satisfy the criteria predefined in terms of patterns of peaks possible for the optical disk of the single layer type. However, the determination may be made differently.

For example, the correlation may be calculated between the waveform of the reflected light signal and the waveforms of the respective reference patterns, such as those shown in FIG. 4, which are possible for the optical disk of the single layer type, and a reference pattern having a waveform similar to the waveform of the pattern detected from the reflected light signal may be detected.

However, the calculation of the correlation needs a rather long time, and thus this method is not advantageous to achieve a reduction in time needed to determine the number of layers. In contrast, in the above described method according to the present embodiment, the determination as to whether the number of peaks detected in the reflected light signal and the difference in amplitude among peaks satisfy the predetermined criterion includes a rather simple process such as the detection of peaks, the dividing operation, and the comparison operation, which do not need complicated processing. Thus, the method according to the present embodiment is advantageous in reduction in the processing time needed to determine the number of layers.

In the embodiment described above, by way of example, the determination is made as to whether a mounted BD is of the single layer type or of the dual layer type. Note that the embodiment of the invention may be used to determine the type of other types of optical recording medium as to whether the optical recording medium is of a single layer type or a multiple layer type.

If patterns of peaks including noise peaks possible for an optical recording medium of a different type with a single layer are similar to those shown in FIG. 4, it is possible to easily determine whether the optical recording medium has a single layer or a plurality of layers by using the method described above. If the specifications of the optical recording medium allow only the single layer or the dual layer, it is possible to correctly the number of layers for any optical recording medium.

If patterns of peaks including noise peaks which are possible for the optical recording medium with the single layer are different from those shown in FIG. 4, the pattern of peaks actually detected from the reflected light signal is compared with the possible patterns to determine whether the detected pattern is similar to one of the possible patterns thereby determining whether the optical recording medium is of the single layer type or the multiple layer type. Also in this case, if the specifications of the optical recording medium allow only the single layer or the dual layer, it is possible to correctly the number of layers for any optical recording medium.

In the embodiment described above, the pull-in signal PI obtained as the reflected light signal is used to determine the number of layers. Alternatively, other signals such as the focus error signal may be used if the signal is obtained by detecting the light reflected from the optical recording medium illuminated with the laser beam and the signal includes peaks corresponding to reflection at the surface and recording layers of the optical recording medium, obtained when the objective lens is driven in the focusing direction.

In the examples described above, it is assumed that the multi-wavelength single-lens pickup is used as optical pickup. Alternatively, other types of optical pickup may be used.

The method of determining the number of layer according to the present embodiment may be used in a case where the reflected light signal includes no noise peaks. Thus, when an optical pickup of a type other than the multi-wavelength single-lens pickup is used, even if use of such an optical pickup results in no appearance of noise peaks, it is possible to correctly detect the number of layers without any problem.

Conversely, when an optical pickup of a type other than the multi-wavelength single-lens pickup is used, even if the detected light signal includes a noise peak for some reason, it is possible to correctly detect the number of layers directly using the method according to the present embodiment.

Second Embodiment

Now, a second embodiment of the present invention is described.

In the second embodiment, the type of a given optical disk D is determined based on peaks detected in a reflected light signal obtained when the objective lens is driven in the focusing direction as in the first embodiment described above.

The disk drive used in the second embodiment is similar in configuration to that shown in FIG. 1, and a duplicated explanation thereof is omitted herein.

The disk drive shown in FIG. 1 is adapted to handle of three types of optical disk D, that is, a BD, a DVD, and a CD. Thus, in the determination of the type of the mounted optical disk D, a rough determination is first made as to whether the optical disk D is of the BD type, the DVD type, or the CD type, and then a further determination is made to detect a sub-type of the optical disk D. For example, when the mounted optical disk D is a BD, a further determination is made as to whether the BD is of the RO type, the R type, or the RE type. In the case of the DVD, a further determination is made to detect whether the DVD is of the ROM type, the R type, or the RW type.

In the rough determination, a determination is first made as to whether the mounted optical disk D is of the BD type or not. If it is determined that the optical disk D is not of the BD type, then a further determination is made as to whether the optical disk D is of the DVD type or not.

The determination as to whether the mounted optical disk D is of the BD type or not is made first because the BD is the newest type of all optical disks and thus BDs are expected to be used most frequently.

The determination of the type among BD, DVD, and CD may be made based on the fact that the distance between the surface to the recording layer varies depending on the type.

Figure 7A:
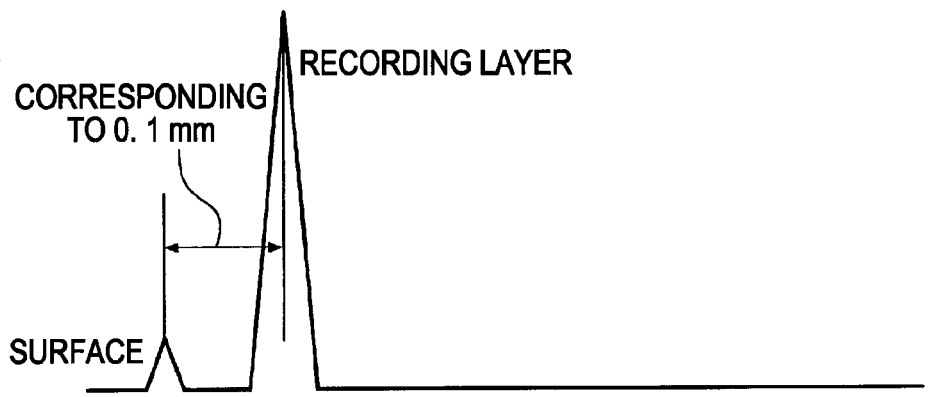
Figure 7B:
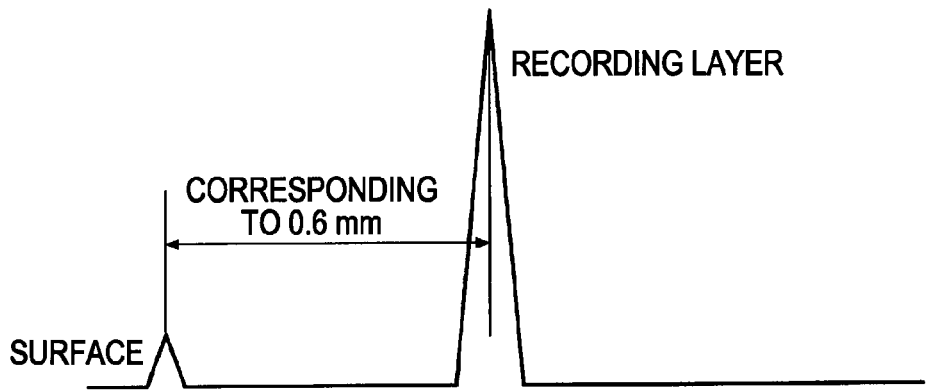
Figure 7C:
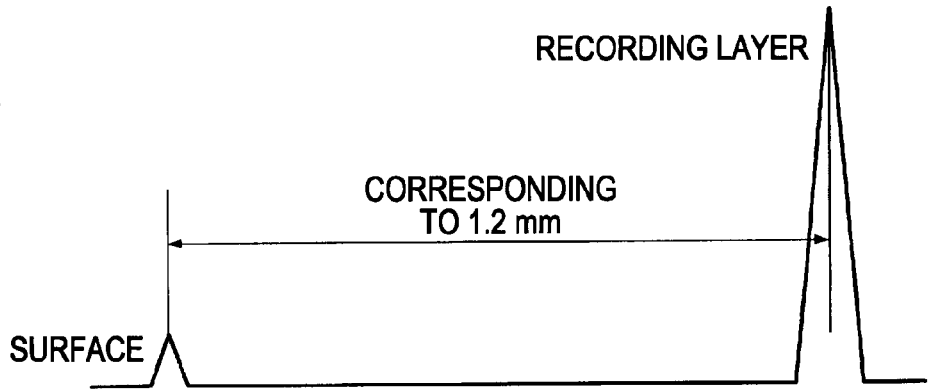

FIGS. 7A to 7C illustrate examples of patterns of peaks detected in the reflected light signal (for example, the pull-in signal PI) obtained when the objective lens is driven in the focusing direction, for the case of the BD of the SL type (FIG. 7A), the DVD of the SL type (FIG. 7B), and the CD (FIG. 7C).

The distance from the disk surface to the recording layer is about 0.1 mm for the BD, 0.6 mm for the DVD, and 1.2 mm for the CD. Therefore, the distance between a peak corresponding to reflection at the disk surface and a peak corresponding to reflection at the recording layer has a value corresponding to 0.1 mm for the BD, 0.6 mm for the DVD, and 1.2 mm for the CD.

Thus, it is possible to determining the disk type among BD, DVD, and CD based on the distance between peaks.

In the disk drive according to the second embodiment, as described above, the determination of the disk type is made by sequentially checking whether the disk is a BD, whether the disk is a DVD, or whether the disk is a CD. That is, first, the laser beam for use with BDs is emitted, and the determination is made as to whether the disk is a BD.

However, when the laser beam for use with BDs is used, there is a possibility that the focal spot of the laser beam does not reach the recording layer if the mounted optical disk D is a DVD/CD, because the recording layer is formed at a deeper location in the DVD/CD than in the BD as described above.

When the laser beam for use with the BD is used, if the optical disk D is a DVD-RW, DVD+RW, or CD-RW on which data has already been recorded, the intensity of the reflected light signal from the recording layer is low, and thus there is a possibility that no peak corresponding to reflection at the recording layer is detected.

Figure 8A:
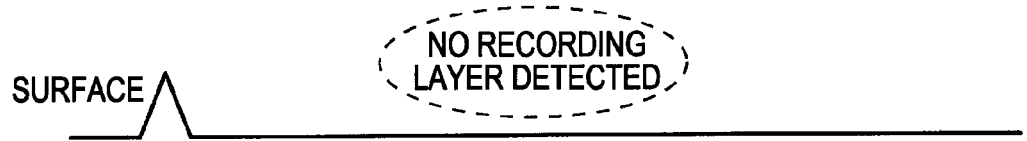
FIGS. 8A and 8B illustrate examples of reflected light signals in which no peak due to reflection at a recording layer appears, which can occur when a DVD/CD is illuminated with a laser beam for use with a BD.
Figure 8B:

That is, in the method in which the laser beam for use with the BD is first used in the determination of the disk type, there is a possibility no peaks corresponding to reflection at the recording layer are detected for a DVD (FIG. 8A) or a CD (FIG. 8B).

Therefore, at this stage of the determination process, it is impossible to correctly determine all disk types.

However, when the laser beam for use with the BD is used, it is possible to detect two peaks if the optical disk D is a BD. Therefore, if the reflected light signal obtained when the objective lens is driven in the focusing direction includes only one peak, it can be determined that the optical disk D is a disk of a type other than a BD, that is, it can be determined that the optical disk D is a DVD/CD. If the reflected light signal includes two peaks, it can be determined that the optical disk D is a BD. Thus, it is possible to determine whether the optical disk D is a BD or other types of disk.

However, in the above-described method of determining the disk type, if there is a contamination such as dust or a defect at a detection point on the optical disk D, there is a high probability that no peak due to reflection at the disk surface is detected. The laser beam for use with the BD has a small spot size compared with the laser beam for use with DVD or CD, and thus even a contamination or a defect with a small size can greatly scatter the laser beam, which can make it difficult to detect a peak corresponding to reflection at the disk surface.

Figure 9:
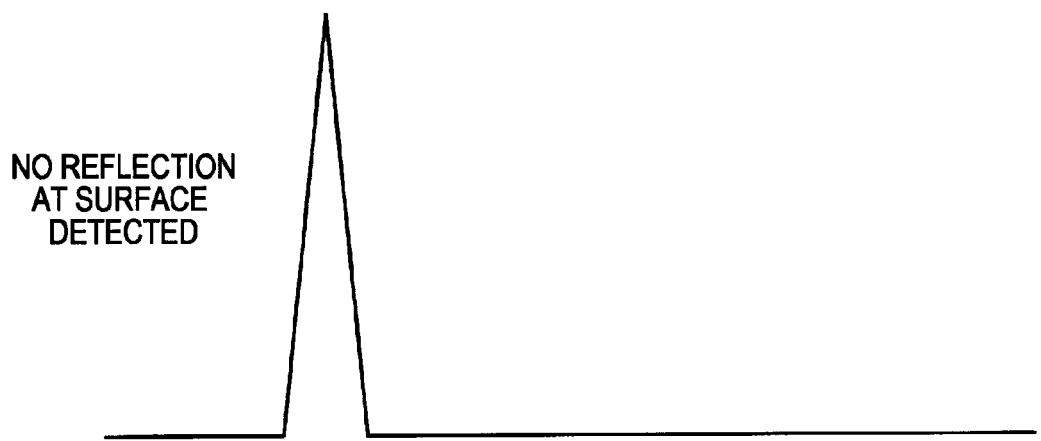
FIG. 9 illustrates an example of a reflected light signal in which no peak due to reflection at a surface of an optical recording medium appears, which can occur when the optical recording medium is a BD of a single layer type.

Thus, even when the optical disk D is a BD, there is a possibility that no peak corresponding to reflection at the disk surface is detected, and only one peak is detected. In this case, the reflected light signal has a pattern such as that shown in FIG. 9.

In conclusion, if the determination whether the optical disk D is a BD or other types of disk is made simply by based on the number of peaks, there is a possibility that the determination is wrong.

If the BD is incorrectly determined as a disk other than the BD, the determination process will proceed to a next step to determine whether the optical disk D is a DVD or not by using the laser beam for use with DVD. This can make it impossible for the disk drive to correctly start the operation or can result in a large delay in starting the operation. In this case, a user has to wait patiently for a long time until the apparatus becomes ready for use after the optical disk D is mounted.

In the second embodiment, to avoid the above problem, the first determination using the laser beam for use with the BD as to whether the mounted optical disk D is a BD or other types of disk is made as follows.

First, under the control of the system controller 10, the mounted optical disk D is illuminated with the laser beam, in a state in which the tracking servo control operation and the focus servo control operation are not performed. As described above, in this case, the laser beam with a wavelength of 405 nm for use with the BD is used.

In this state in which the mounted optical disk D is being illuminated with the laser beam, the objective lens is driven in the focusing direction. A pull-in signal PI obtained as a reflected light signal is input to the matrix circuit 4. The pull-in signal PI is analyzed to detect peaks and the amplitude of each peak, and information associated with the peaks is stored. Thus, information indicating the number of peaks, n, included in the pull-in signal PI and the amplitude of each peak has been acquired.

Herein, the patterns of peaks possible for the BD are summarized below.

When the laser beam for use with the BD is used, if the optical disk D has no contamination or defect on disk surface, peaks appear as follows.

If the optical disk D is a BD-SL, two peaks appear at the surface and the recording layer.

If the optical disk D is a BD-DL, three peaks appear at the surface, the first recording layer, and the second recording layer.

Thus, when the optical disk D is a BD having no contamination or defect, two or more peaks are detected.

When the optical disk D is a BD having a contamination or a defect, peaks appear as follows.

If the optical disk D is a BD-SL, only one peak appears at the recording layer.

If the optical disk D is a BD-DL, two peaks appear at the first recording layer and the second recording layer.

When the optical disk D is a DVD or a CD, only one peak appears at the disk surface as shown in FIGS. 8A and 8B in the reflected light signal obtained using the leaser beam for use with the BD, regardless of whether there is a contamination or a defect.

Thus, only one peak is detected in both cases where the optical disk D is a BD-SL having a contamination or a defect and where the optical disk D is a DVD/CD. This can cause the disk type to be incorrectly determined.

To prevent such an incorrect determination, when the number of peak, n, is equal to 1, a further determination is made to confirm whether the optical disk D is a BD or other types of disk.

In the second embodiment, fur the above purpose, the difference in reflectivity between the disk surface and the recording layers is used. The disk surface has a reflectivity of 4 to 5%, while the recording layers of the BD have a reflectivity of 12 to 70%.

That is, when the number of peaks, n, is equal to 1, a determination is made as to whether the detected single peak has an amplitude corresponding to the reflectivity of 4 to 5% thereby determining whether the detected single peak is due to reflection at the disk surface. More specifically, the determination as to whether the detected peak is due to reflection at the surface of the disk is made by determining whether the amplitude of the peak is lower than a predetermined threshold value.

If it is determined that the detected peak is due to reflection at the surface of the disk, it is determined that one of the cases shown in FIGS. 8A and 8B has occurred, and thus it is determined that the current optical disk D is of the DVD/CD type.

On the other hand, if it is determined that the detected peak is not due to reflection at the surface of the disk, there is a possibility that the peak is due to reflection from a contamination or a defect at a particular point on a BD. To check whether this is the case, the peak detection is performed at a different point on the optical disk D. More specifically, the optical pickup 1 is moved by the sled mechanism 3 by a predetermined distance in a radial direction of the optical disk D, and the peak detection is performed again at this point on the optical disk D while moving the objective lens in the focusing direction.

If two or more peaks are detected in the re-detection at the new point on the optical disk, that is, if $n \geq 2$, it can be determined that the mounted optical disk D is a BD on the assumption that the BD laser does not reach the recording layer of the optical disk D of the DVD/CD type.

However, although the assumption that when the BD laser is used, the laser spot does not reach the recording layer of the optical disk D of the DVD/CD type holds in most cases, this assumption does not necessarily hold in all cases. That is, there is a possibility that the laser spot of the BD laser reaches the recording layer of the C of the DVD/CD type, although the probability is very low. That is, there is a small probability that two or more peaks are detected for an optical disk D of the DVD/CD type.

This means that when two or more peaks are detected, if it is determined that the current optical disk D is a BD, there is a possibility that an optical disk D of the DVD/CD type is incorrectly determined as a BD.

To avoid such an incorrect determination, when two or more peaks are detected, a further determination is made as to whether the distance between the first peak and the second peak is equal to or less than a predetermined threshold value.

In the case of the BD of the SL type, the distance between the surface of the disk and the recording layer is 0.1 mm. In the case of the BD of the DL type, the distance between the surface of the disk and the first recording layer is 75 µm, and the distance between the first recording layer and the second recording layer is 25 µm. When the optical disk D is a BD of the DL type, at least two peaks appear (at the first recording layer and the second recording layer) even if there is a contamination or a defect, and the distance between these two peaks corresponding to the first and second recording layers has a value corresponding to 0.1 mm. On the other hand, the distance between the disk surface and the recording layer is 0.6 mm for DVD disks, and 1.2 mm for CD disks.

Thus, from the distance between two peaks it is possible to determine the disk type as follows. That is, when the number of peaks, n, is equal to or greater than 2, and there is a possibility that the optical disk D is a BD or a DVD/CD, if the distance between the first peak and the second peak has a value corresponding to 0.1 mm or less, the optical disk D is a BD, but if the distance has a value corresponding to 0.6 mm or greater, the optical disk D is a DVD/CD.

More specifically, a determination is made as to whether the distance between first and second peaks is smaller than a value corresponding to 0.3 mm. If so, it is determined that the optical disk D is a BD, but otherwise it is determined that the optical disk D is of the DVD/CD type.

Thus, when two or more peaks are detected, the check based on the distance between first and second peaks is performed in the above-described manner to correctly determine whether the optical disk D is of the BD type or of the DVD/CD type. This makes it possible to prevent an incorrect determination due to reaching of the laser spot of the BD laser to a recording layer of an optical disk D of the DVD/CD type.

In the case where the result of the re-detection of peaks is not that the number of peaks, n, is equal to or greater than 2, the mounted optical disk D is very unlikely to be a BD for which a surface reflection peak has missed. Thus, in this case, it is confirmed whether the mounted optical disk D is of the DVD/CD type.

More specifically, a determination is made as to whether the number of peaks, n, is equal to 1. If n=1, a further determination is made as to whether the peak has an amplitude corresponding to a reflectivity of 4 to 5%. If so, it is determined that the mounted optical disk D is of the DVD/CD type.

If the amplitude does not correspond to the reflectivity of 4 to 5%, an error handling process is performed without performing further re-detection of peaks. That is, in this case, as a result of the re-detection of peaks, it is determined that the number of peaks, n, is equal to 1, and the amplitude of the peak indicates that the peak is not due to reflection at the surface of the disk. However, this cannot occur for any of type of optical disks including BD, DVD, and CD disks. Thus, in this case, the error handling process is performed.

In the above explanation, it is assumed that the number of peaks, n, is 2 or 1. However, there is a possibility that n=0, that is, no peaks are detected.

If the number of peaks, n, is equal to 0, the detection of peaks is retried at a different point on the optical disk D, in a similar manner as described above. On the basis of the result of the retried detection of peaks, the determination is made in a similar manner as described above.

More specifically, first, a determination is made as to whether the number of peaks, n, is equal to or greater than 2. If n≧2, a further determination is made as to whether the distance between the first and second peaks is equal to or less than a value corresponding to 0.3 mm. If so, it is determined that the mounted optical disk D is a BD, but otherwise it is determined that the mounted optical disk D is of the DVD/CD type.

If the result of the determination denies that n≧2, a further determination is made as to whether the number of peaks, n, is equal to 1. If n=1, a further determination is made as to whether the peak has an amplitude corresponding to a reflectivity of 4 to 5%, as described above. If so, it is determined that the mounted optical disk D is of the DVD/CD type. When n=1, if the amplitude of the peak does not correspond to the reflectivity of 4 to 5%, an error handling process is performed without performing further retry of detection of peaks.

If the result of the retried detection of peaks again indicates that the number of peaks, n, is not equal to 1 but equal to 0 (that is, if n=0 at both different detection points), it is determined that no disk is mounted.

As described above, when the number of peaks, n, is equal to 0, the detection of peaks is retried without immediately determining that no disk is mounted, taking into account the possibility that neither a surface nor a recording layer of a BD of the SL type is detected for some reason, or the possibility that a surface of a DVD/CD disk is not detected.

Figure 10:
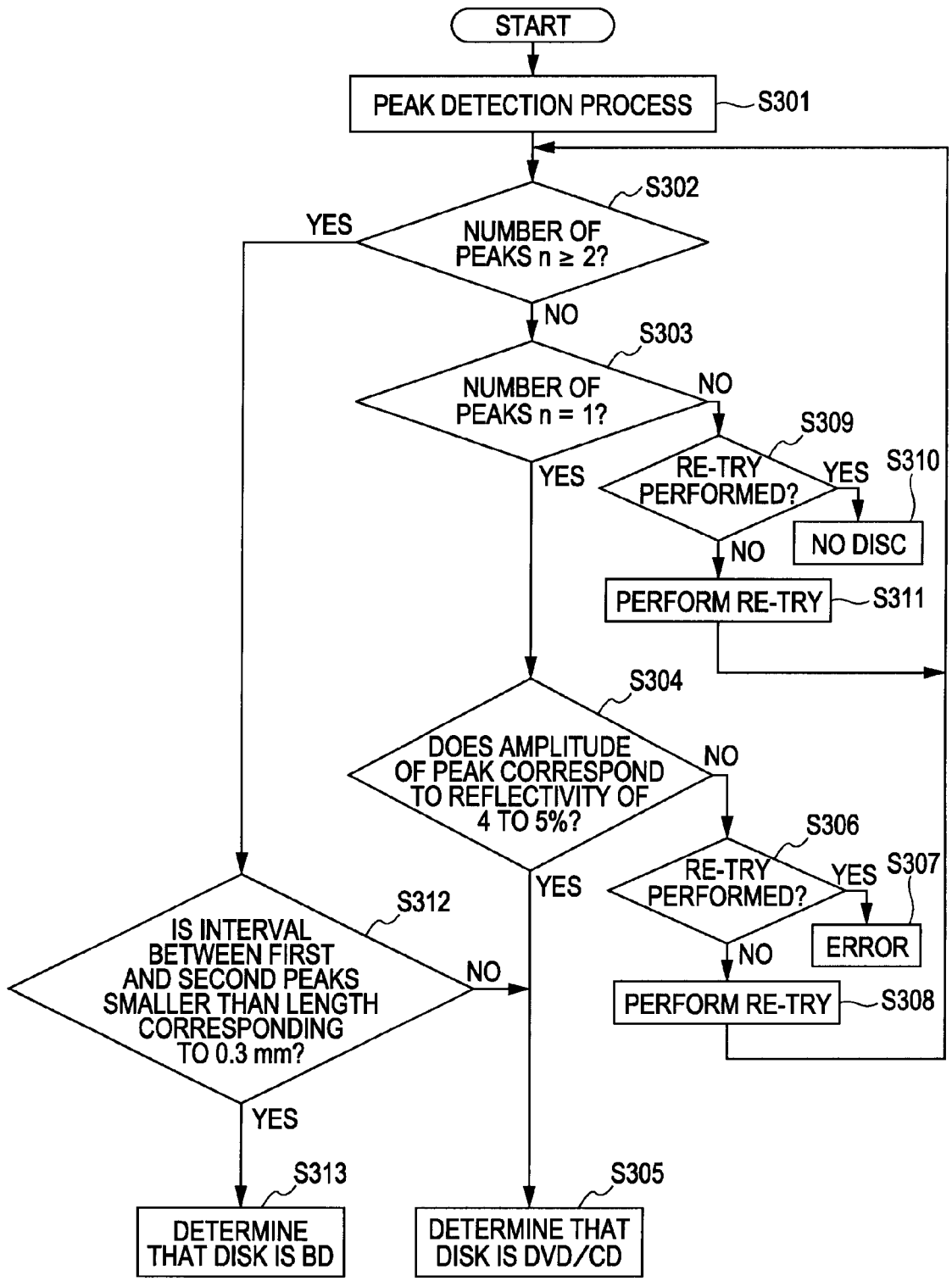
FIG. 10 is a flow chart associated with a determination process according to an embodiment of the present invention.

FIG. 10 illustrates a processing flow of the operation of determining whether the mounted optical disk D is a BD or a DVD/CD disk according to the second embodiment of the present invention.

The operation shown in FIG. 10 is performed by the system controller 10 in accordance with a program stored in an internal memory.

First, in step S301, peaks included in the pull-in signal PI are detected in a similar manner to step S101 in FIG. 5.

Next, in step S302, a determination is made as to whether the number of peaks, n, is equal to or greater than 2 (that is, whether n≧2).

If the determination as to whether n≧2 is negative, the process proceeds to step S303. In step S303, a determination is made as to whether the number of peaks, n, is equal to 1.

If n=1, the process proceeds to step S304. In step S304, a further determination is made as to whether the peak has an amplitude corresponding to a reflectivity of 4 to 5%, by determining whether the amplitude of the peak is lower than a predetermined threshold value.

If the determination as to whether the amplitude of the peak is lower than the predetermined threshold value is affirmative, the process proceeds to step S305. In step S305, it is determined that the mounted optical disk D is of the DVD/CD type.

On the other hand, if the determination as to whether the amplitude of the peak is lower than the predetermined threshold value is negative, the process proceeds to step S306. In step S306, it is determined whether retrying of peak detection has been performed in step S308 or S311.

If it is determined that retrying has already been performed, the process proceeds to step S307. In step S307, a predetermined error handling process is performed.

On the other hand, if it is determined in step S306 that retrying has not been performed, then the process proceeds to step S308 to retry the peak detection. In this retrying process, first, the servo circuit 11 is controlled such that the optical pickup 1 is moved by the sled mechanism 3 by a predetermined distance in the radial direction of the disk. Thereafter, the peak detection process is performed in a similar manner to step S301, that is, the detection of peaks is retried at a point different from the previous point on the optical disk D.

After completion of step S308, the process returns to step S302 as shown in FIG. 10 to make a re-determination as to the number of peaks and the amplitude of each peak.

If the determination in step S303 as to whether n=1 is negative, the process proceeds to step S309. In step S309, as in step S306, it is determined whether retrying of peak detection has been performed in step S308 or S311.

If it is determined that retrying has already been performed, the process proceeds to step S309. In step S309, it is determined that no disk is mounted.

On the other hand, if it is determined that retrying has not been performed, the process proceeds to step S311. In step S311, detection of peaks is retried. Thereafter, the process returns to step S302.

In the case where the determination in step S302 as to whether n≧2 is negative, the process proceeds to step S312. In step S312, a further determination is made as to whether the distance between the first and second peaks is equal to or less than a value corresponding to 0.3 mm, by determining whether the distance between the first and second peaks is equal to or less than a predetermined threshold value.

If the determination in step S312 is negative as to whether the distance between the first and second peaks is equal to or less than a value corresponding to 0.3 mm, the process proceeds to step S305. In step S305, it is determined that the mounted optical disk D is of the DVD/CD type.

If the determination in step S312 is affirmative as to whether the distance between the first and second peaks is equal to or less than a value corresponding to 0.3 mm, the process proceeds to step S313. In step S313, it is determined that the optical disk D is a BD.

In the second embodiment, as described above, when the number of peaks, n, is equal to 1 and there is a possibility that the optical disk D is a DVD/CD or a BD-SL with a contamination which causes a peak at the disk surface to disappear, the peak detection is retried at a different point on the optical disk D, and the number of peaks, n, and the amplitude of each peak are re-evaluated thereby ensuring that the determination as to whether the optical disk D is a BD or a DVD/CD is correctly made even when the optical disk D has a contamination or the like.

Furthermore, in the second embodiment, as described above, when the number of peaks n≧2, it is not immediately determined that the optical disk D is a BD, but a further determination is made as to whether the distance between the first and second peaks is equal to or less than the predetermined threshold. If the distance is equal to or less than the predetermined threshold, it is determined that the optical disk D is a BD, but otherwise it is determined that the optical disk D is a DVD/CD. This makes it possible to correctly determine whether the optical disk D is a BD or a DVD/CD even in the case where the laser spot of the laser beam for use with the BD reaches the recording layer of the DVD/CD.

In the above-described examples according to the second embodiment, the retrying of the peak detection is performed such that the detection point on the disk is changed to a new different point by driving the sled mechanism 3 and the retrying of the peak detection is performed at the new detection point on the disk. Alternatively, the detection point may be changed by driving the spindle motor 2. However, when the spindle motor 2 is driven, it takes a considerably long time for the spindle motor 2 to stop. From this point of view, use of the sled mechanism 3 is more desirable to achieve a reduction in the detection time.

Third Embodiment

Now, a third embodiment of the present invention is described.

In this third embodiment, when a BD is mounted as the optical disk D, an optimum tracking mode is selected depending on the type of the BD.

The disk drive used in the third embodiment is similar in configuration to that shown in FIG. 1, and a duplicated explanation thereof is omitted herein.

In the disk drive for BDs, an optimum tracking method is selected depending on the whether the BD is of a read-only type such as a BD-RO or a recordable type such as a BD-R or BD-RE. More specifically, when the optical disk D is a BD-RO, a DPD (Differential Phase Detection) tracking method is used, while a DPP (Differential Push-Pull) tracking method is used for a BD-R and a BD-RE.

If an incorrect tracking method is selected, the tracking servo control does not work correctly or data cannot be correctly read from the disk.

Therefore, when an optical disk D is mounted, it is necessary to determine whether the mounted optical disk D is a BD-RO or BD-R/BD-RE before the tracking servo control is started.

Figure 11:
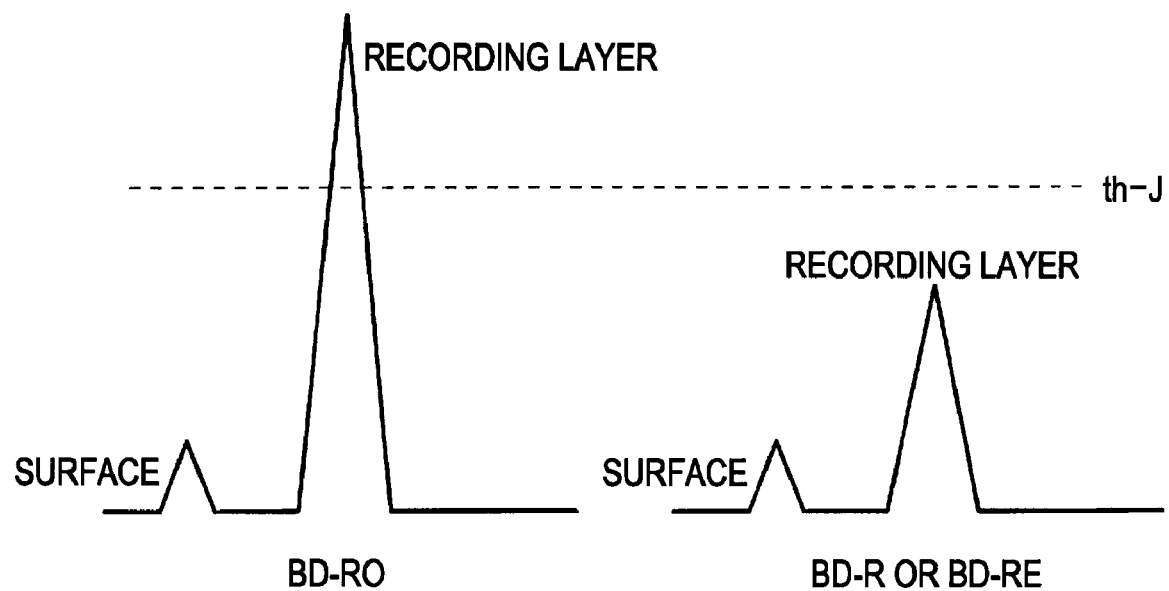
FIG. 11 illustrates a method of determining whether a BD is of a RO type or a R/RE type, simply by comparing a reflected light signal with a threshold value th-J.

The determination as to whether the mounted optical disk D is a BD-RO or BD-R/BD-RE may be made based on the difference in reflectivity of recording layers among the disk types, as shown in FIG. 11. As described above, the recording layer of the BD-RO (SL) has a reflectivity of 35 to 70%, while the recording layer of the BD-R/BD-RE has a reflectivity of 12 to 24%. Thus, by setting the threshold value th-J shown in FIG. 11 to a value corresponding to the reflectivity of 30% or a similar value, it is possible to detect the disk type.

However, the specifications of the BD allow the BD-RO to have a low reflectivity similar to that of the BR-R/BD-RE. That is, there is a possibility that the mounted BD is a BD-RO with a low reflectivity. In the case of a low-reflectivity BD-RO of a DVD/BD hybrid type, a BD-RO layer is formed at a depth of 0.1 mm as measured from the disk surface and a DVD-ROM layer is formed at a depth of 0.6 mm. In the case of a low-reflectivity BD-RO of a CD/BD hybrid type, a BD-RO layer is formed at a depth of 0.1 mm as measured from the disk surface and a CD-ROM layer is formed at a depth of 1.2 mm.

The existence of low-reflectivity BD-RO results in the possibility that the determination of the disk type simply based on the threshold value th-J causes an incorrect tracking method to be selected.

More specifically, for example, when a low-reflectivity BD-RO is mounted, there is a possibility that the mounted disk is incorrectly determined to be a BD-R/BD-RE, and thus the DPP tracking method is incorrectly selected instead of the correct DPD tracking method.

As described above, if the incorrect tracking servo control method is used, there is a possibility that data cannot be read, although the mounted optical disk D is a disk, such as a DVD/BD hybrid or a CD/BD hybrid, satisfying the specifications.

In the third embodiment, to avoid the above problem, the tracking method is correctly selected depending on the disk type including the DVD/BD hybrid and the CD/BD hybrid, as follows.

Basically, the determination is made using the threshold value th-J as shown in FIG. 11. More specifically, first, as in the first and second embodiments described above, peaks are detected from the reflected light signal (for example, the pull-in signal PI) and a determination is made as to whether there is a peak with an amplitude equal to or greater than the threshold value th-J.

If a peak with an amplitude equal to or greater than the threshold value th-J is found, the DPD tracking mode is selected.

If the reflected light signal includes no peak having an amplitude equal to or greater than the threshold value th-J, the DPP tracking mode is tentatively selected and it is tried to read data while the tracking servo control operation is performed in the DPP mode.

Note that the tracking mode between the DPP mode and the DPD is switched by switching the detector in the optical pickup 1 thereby switching the output signal, and also by switching the mode of calculating the tracking error signal TE in the matrix circuit 4.

After the tracking servo control operation is started in the DPP mode, it is determined whether the servo control works successfully and data can be correctly read.

If data can be correctly read in the DPP tracking mode, it is determined that the mounted optical disk D is a BD-R/BD-RE, and thus the DPP tracking mode is maintained.

However, if data cannot be correctly read, it is determined that the mounted optical disk D is a low-reflectivity BD-RO, and the tracking mode is switched into the DPD mode.

As described above, when the reflected light signal has no peak having an amplitude equal to or greater than the threshold value th-J, and there is a possibility that the mounted optical disk D is a BD-R/BD-RE or a low-reflectivity BD-RO, the DPP tracking mode is tentatively selected and a determination is made as to whether the mounted optical disk D is a BD-R/BD-RE. This makes it possible to correctly detect a low-reflectivity BD-RO. Thus, it is possible to correctly select an optimum tracking mode depending on the disk types including BD-RO, BD-R, BD-RE, and low-reflectivity BD-RO.

In the above description, the problem with the incorrect determination for low-reflectivity BD-RO has been discussed. In practice, even a BD-RO of an ordinal type can have no peak with an amplitude equal to or greater than the threshold value th-J due to degradation of the laser diode, depositing of contamination on the disk surface, a defect on the disk surface, etc. Also in this case, as with the low-reflectivity BD-RO, the DPP tracking mode is incorrectly selected although the mounted optical disk D is a BD-RO.

In the third embodiment, even when a BD-RO of ordinal type have no peak with an amplitude equal to or greater than the threshold value th-J, it is possible to select a correct tracking mode.

Figure 12:
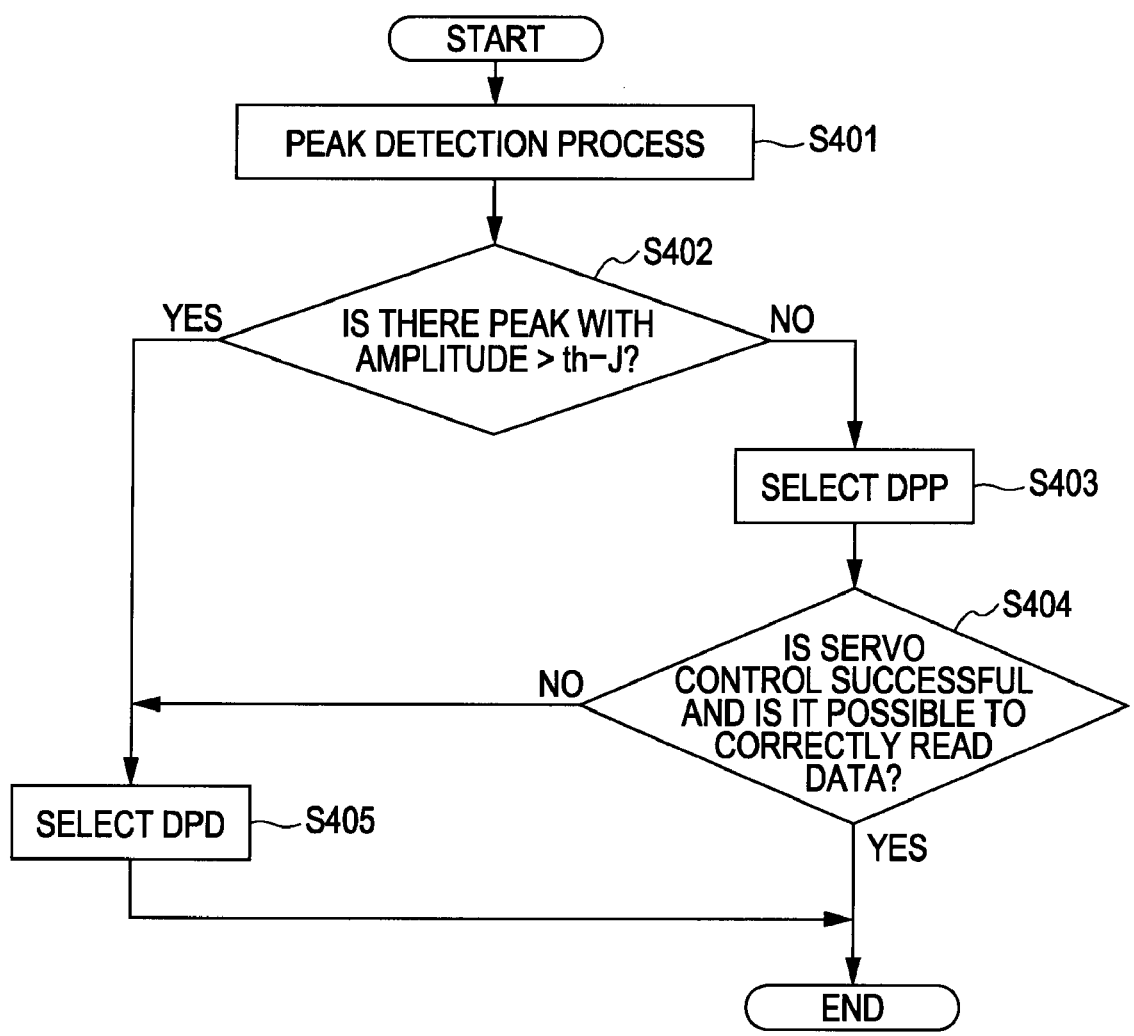
FIG. 12 is a flow chart associated with a process according to an embodiment of the present invention.

FIG. 12 is a flow chart illustrating the process according to the third embodiment of the invention.

The process shown in FIG. 12 is performed by the system controller 10 in accordance with a program stored in a ROM or a similar memory.

First, in step S401, the peak detection process is performed in a similar manner to step S101 shown in FIG. 5.

In step S402, a determination is made as to whether the pull-in signal PI includes a peak with an amplitude equal to or greater than the threshold value th-J. If the determination as to whether the pull-in signal PI includes a peak with an amplitude equal to or greater than the threshold value th-J is affirmative, it is determined that the mounted optical disk D is a BD-RO, and thus the process proceeds to step S405 and the DPD tracking mode is selected.

More specifically, the matrix circuit 4 is controlled so as to generate the tracking error signal TE in the DPD tracking mode.

Although in FIG. 1, a control line between the system controller 10 and the matrix circuit 4, the control line is disposed between them to realize the third embodiment.

If the determination in step S402 as to whether the pull-in signal PI includes a peak with an amplitude equal to or greater than the threshold value th-J is negative, the process proceeds to step S403 and the DPP tracking mode is selected. More specifically, the matrix circuit 4 is controlled so as to generate the tracking error signal TE in the DPP tracking mode.

Next, in step S404, a determination is made as to whether the servo control is working successfully and thus data can be read successfully.

More specifically, a command is sent to the servo circuit 11 to start the tracking servo control operation, and access a particular address on the optical disk D to read data stored at that address. If a predetermined condition is satisfied (for example, if the error rate is less than a predetermined threshold value), it is determined that the servo control is successfully working and it is possible to correctly read data.

If it is determined in step S404 that the servo control is working successfully and it is possible to correctly read data, the present process is ended. Note that in this case, the DPP mode is selected as the tracking mode.

On the other hand, if the determination in step S404 is negative, that is, if reading of data failed, the process proceeds to step S405. In step S405, the DPD mode is selected as the tracking mode. This processing flow from S404 to S405 prevents the DPP tracking mode from being incorrectly selected simply based on the reflectivity when the mounted optical disk D is a low-reflectivity BD-RO.

In the above description, the method of preventing the DPP tracking mode from being incorrectly selected for a ROM disk usually having a high reflectivity has been discussed. Conversely, there is a possibility that a R/RE disk having a low reflectivity is incorrectly determined as a ROM disk with a high reflectivity.

Such an incorrectly determination can occur due to variations in characteristics of the optical system or variations in environmental conditions such as ambient temperature, which can cause peaks of the reflected light signal to be incorrectly detected as being high.

The method of preventing a R/RE disk from being incorrectly determined as a ROM disk according to the third embodiment may be modified as follows.

When the pull-in signal PI has no peak having an amplitude equal to or greater than the threshold value th-J and thus the DPP tracking mode is selected, a determination is made as to whether the tracking servo control works successfully in the DPP mode and thus data can be correctly read. If data can be correctly read, it is determined that the mounted optical disk D is a ROM disk, and the DPD tracking mode is maintained.

If data cannot be correctly read, the tracking mode is switched into the DPP mode, and a determination is made as to whether data can be correctly read. If data can be correctly read, it is determined that the mounted optical disk D is a R/RE disk, and the DPP tracking mode is maintained.

Also in this alternative method, it is possible to select a correct tracking mode depending on whether data can be correctly read, even in the case where there is a possibility that a R/RE disk has a peak with an abnormally high amplitude.

Figure 13:
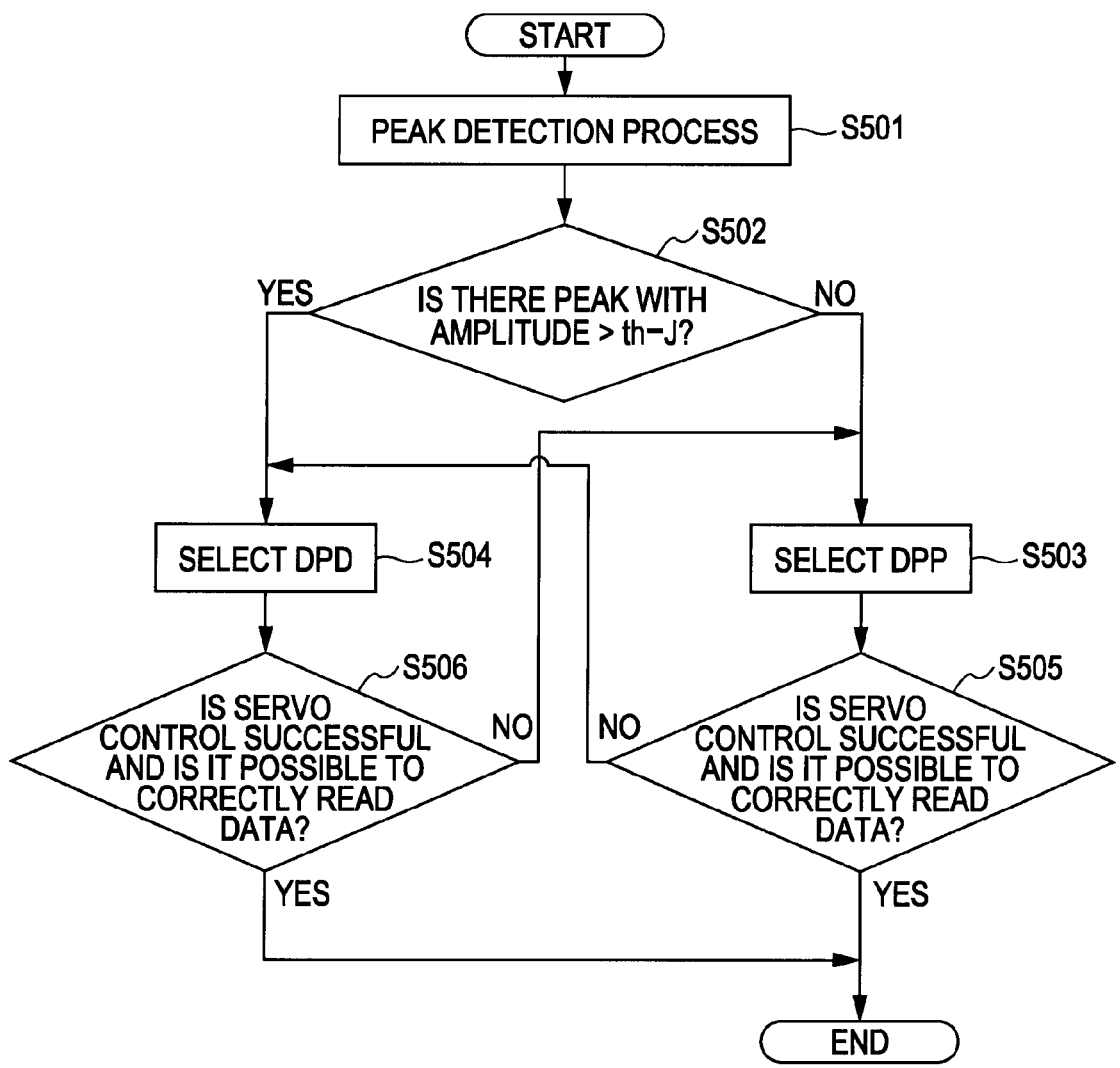
FIG. 13 is a flow chart associated with a process according to an embodiment of the present invention.

FIG. 13 illustrates a processing flow of the operation according to the modification of the third embodiment. The process shown in FIG. 13 is performed by the system controller 10 in accordance with a program stored in a ROM or a similar memory.

First, steps S501 and S502 are performed in a similar manner to step S401 and S402 shown in FIG. 12. If the determination in step S502 as to whether the pull-in signal PI includes a peak with an amplitude equal to or greater than the threshold value th-J is negative, the process proceeds to step S503 and the DPP tracking mode is selected. If it is determined in step S502 that the pull-in signal PI includes a peak with an amplitude equal to or greater than the threshold value th-J, the process proceeds to step S504 and the DPD tracking mode is selected.

In the case where the DPP tracking mode is selected in step S503, the process proceeds to step S505 to determine whether the tracking servo control works successfully in the DPP mode and thus data can be correctly read. If data can be correctly read, the process is ended in the state in which the DPP tracking mode is selected.

However, if data cannot be correctly read, the process proceeds to step S504 and the DPD mode is selected as the tracking mode.

In the case where the DPD tracking mode is selected in step S504, a further determination is made in step S506 as to whether the servo control is working successfully and thus data can be read successfully. If the determination in step S506 is affirmative as to whether the servo control is working successfully and it is possible to correctly read data, the process is ended in the state in which the DPD tracking mode is selected.

If the determination in step S506 is negative, that is, if data cannot be correctly read, the process returns to step S503 and the DPP tracking mode is selected. Thus, even when a peak is incorrectly determined to be greater in amplitude than the threshold value th-J for a R/RE disk, and the DPD tracking mode is incorrectly selected, the check performed subsequently as to whether the servo control works successfully and data can be correctly read makes it possible to finally select a correct tracking mode.

In the modified method described above, the process has a loop in which "data cannot be correctly read"→"tracking mode is switched into the other mode"→"determination is made as to whether data can be correctly read".

In the case where an incorrect determination occurs as a result of an increase or reduction in reflectivity due to depositing of dust or the like or variations in characteristics of the optical system or environmental conditions, the determination as to the tracking mode converges to one of the tracking modes. However, if the disk drive or the optical disk D has a failure, there is a possibility that the loop is executed endlessly.

To prevent the above problem, it is desirable to limit the number of times that the tracking mode is switched into the other tracking mode when data cannot be correctly read in the tracking mode selected based on the peak amplitude relative to the threshold value th-J. For example, the number of times is limited to once.

Fourth Embodiment

Now, a fourth embodiment of the present invention is described.

In this fourth embodiment, techniques according to the first to third embodiments are combined such that processes including determining whether the optical disk D is a BD or a DVD/CD, if the optical disk D is a BD, further determining whether the BD is of the SL type or the DL type, and selecting the DPP/DPD tracking mode are performed via a sequence of processing steps.

The disk drive used in the fourth embodiment is similar in configuration to that shown in FIG. 1, and a duplicated explanation thereof is omitted herein.

However, the process according to the fourth embodiment includes, in addition to the process of the combination of those according to the first to third embodiments, the step of adjusting the gain of the reflected light signal by adjusting the sensitivity of the photodector depending on the level of the detected reflected light signal.

The adjustment of the gain is performed so that a reduction in the level of the reflected light signal due to degradation of the laser diode with time or depositing of dust or the like on the objective lens is compensated for.

In each embodiment described above, the determination of the disk type and the determination of the number of recording layers are made based on amplitudes of peaks included in the reflected light signal. Thus, a reduction in the level of the reflected light signal can cause the determination to become incorrect.

To achieve the adjustment of the gain, the level of the signal of light reflected from the disk surface (for example, the level of the pull-in signal PI) is measured as a reference level of the reflected light signal when the disk drive is shipped from a factory, and stored in the memory disposed in the system controller 10. In operation, each time an optical disk D is mounted on the disk drive, the level of the reflected signal level in a state in which the laser light is focused on the surface of the optical disk D is measured (in other words, the amplitude of the first peak is measured), and the measured level of the signal of light reflected from the disk surface is compared with the reference level of the reflected light signal, and the gain of the reflected light signal is adjusted in accordance with the comparison result. More specifically, if the measured level of the reflected light signal is lower than the reference level of the reflected light signal, the gain of the reflected light signal is increased by a predetermined amount.

The adjustment of the gain of the reflected light signal makes it possible to control the level of the reflected light signal to be equal to the reference level of the reflected light signal regardless of degradation of the laser diode with time or depositing of dust or the like on the objective lens, thereby ensuring that the determination of the disk type and the determination of the number of recording layers can be correctly performed based on the amplitudes of peaks included in the reflected light signal.

In the fourth embodiment the gain adjustment is performed in a two-step manner depending on the reduction in the reflected light signal level.

More specifically, the ratio (V1/Vref) of the measured level (V1) of the reflected light signal to the reference level (Vref) of the reflected light signal is compared with two threshold values, that is, a threshold value th-R1 (for example, 0.4) and a threshold value th-R2 (for example, 0.6). First, it is determined whether the ratio (V1/Vref) is equal to or smaller than the threshold value th-R1, that is, whether V1/Vref$\leq$0.4. If it is determined that V1/Vref$\leq$0.4, the gain of the reflected light signal is increased by a first predetermined amount (for example, 6 dB).

In the case where V1 has not decreased so greatly that V1/Vref$\leq$0.4, a further determination is made as to whether the ratio of the measured reflected light signal level V1 to the reference reflected light signal level Vref is equal to or smaller than the threshold value th-R2, that is, whether V1/Vref$\leq$0.6. If it is determined that V1/Vref$\leq$0.6, the gain of the reflected light signal is increased by a second predetermined amount (for example, 3 dB). If the determination as to whether V1/Vref$\leq$0.6 is negative, the gain adjustment is not performed.

By performing the gain adjustment in the two-step manner as described above, it becomes possible to finely compensate for the reduction in the level of the reflected light signal.

The gain adjustment of the reflected light signal may be achieved, for example, by adjusting the gain of an amplifier disposed in the matrix circuit 4 and adapted to amplify the reflected light signal output from the photodetector. The gain adjustment is performed via a control line from the system controller 10 to the matrix circuit 4, although the control line is not shown in FIG. 1.

In the fourth embodiment, the gain adjustment is performed in a step between the step of determination of whether a BD is the SL type or the DL type and the step of selection of the DPP/DPD tracking mode. That is, in the fourth embodiment, the process includes (1) determining whether the mounted optical disk D is a BD or DVD/CD, (2) if the mounted optical disk D is a BD, determining whether the BD is of the SL type or the DL type, (3) adjusting the gain of the reflected light signal, and (4) selecting the DPP/DPD tracking mode.

FIGS. 14 to 17 illustrate a processing flow of the operation according to the fourth embodiment. The operation shown in FIGS. 14 to 17 is performed by the system controller 10 in accordance with a program stored in the ROM or the like disposed in the system controller 10.

The operation shown in FIGS. 14 to 17 is started when an optical disk D is mounted on the disk drive.

Figure 14:
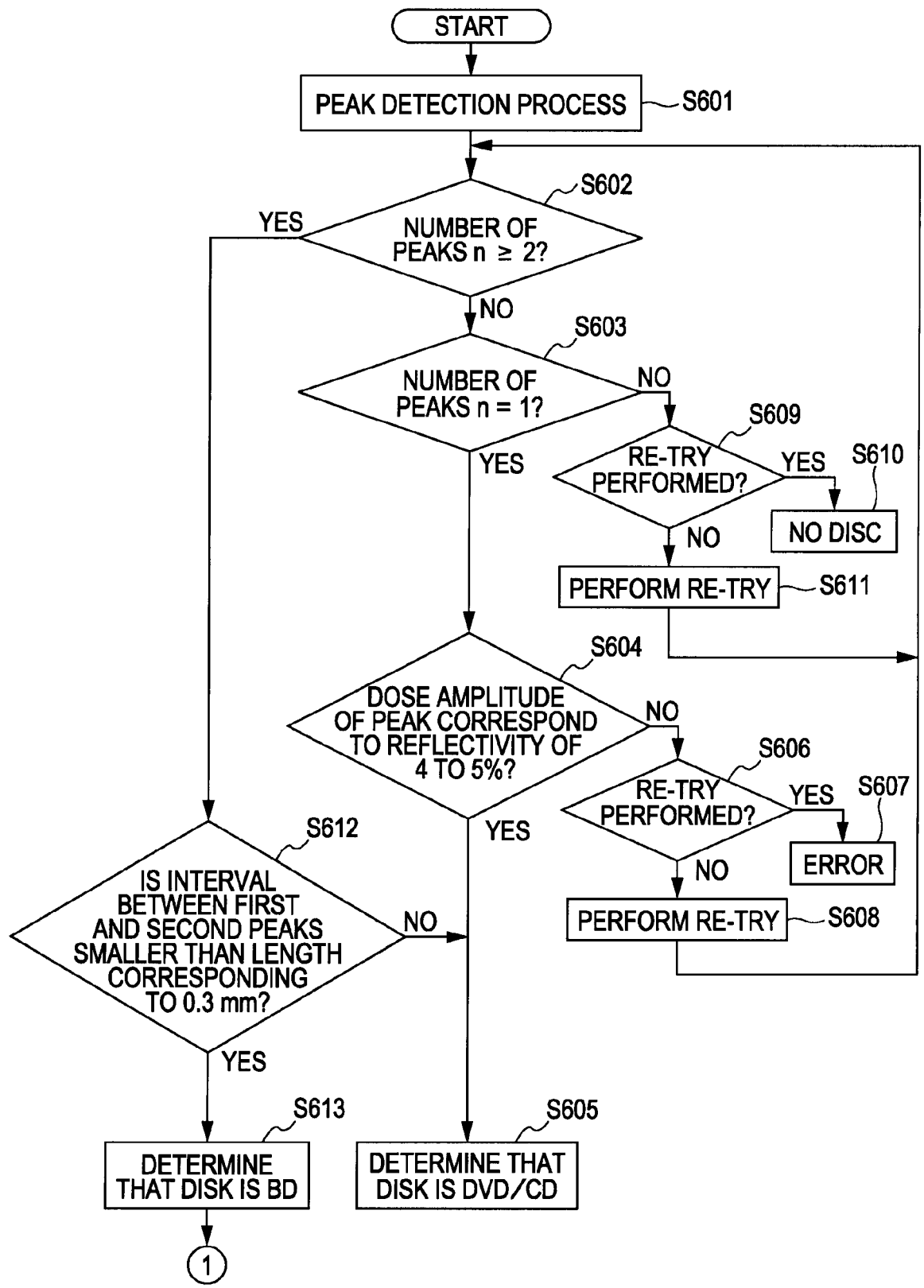
FIG. 14 is a flow chart associated with a process of determining whether an optical recording medium is a BD or a DVD/CD disk according to an embodiment of the present invention.

Of various processes included in the operation according to the fourth embodiment, FIG. 14 illustrates a process of determining whether the mounted optical disk D is a BD or a DVD/CD.

The process shown in FIG. 14 is similar to the process of determining whether the mounted optical disk D is a BD or a DVD/CD according to the second embodiment described above with reference to the flow chart shown in FIG. 10. Steps S601 to S613 in the flow chart shown in FIG. 14 are performed in a similar manner to steps S301 to S313 in FIG. 10.

Figure 15:
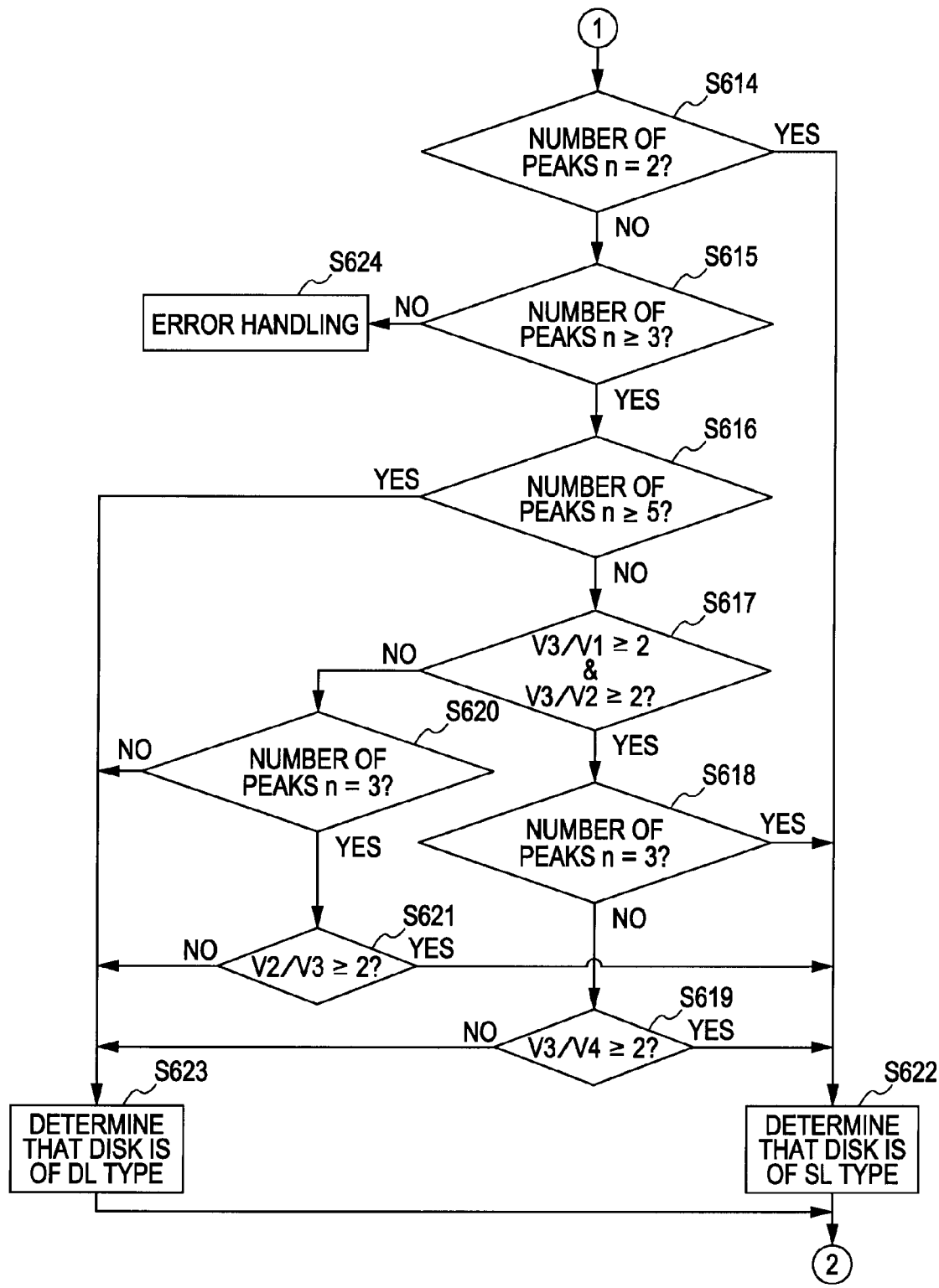
FIG. 15 is a flow chart associated with a process of determining whether an optical recording medium is a BD of a single layer type or a BD of a dual layer type according to an embodiment of the present invention.

If it is determined in step S613 that the mounted optical disk D is a BD, the processing flow proceeds to step S614 in FIG. 15.

FIG. 15 illustrates a process performed after the process shown in FIG. 14. In this process shown in FIG. 15, a determination is made as to whether the BD is the SL type or the DL type.

This process of determining whether the BD is of the SL type or the DL type is performed in a similar manner to the process according to the first embodiment described above with reference to FIG. 5. That is, steps S614 to S624 in the flow chart shown in FIG. 15 are performed in a similar manner to steps S102 to S112 in FIG. 5.

Figure 16:
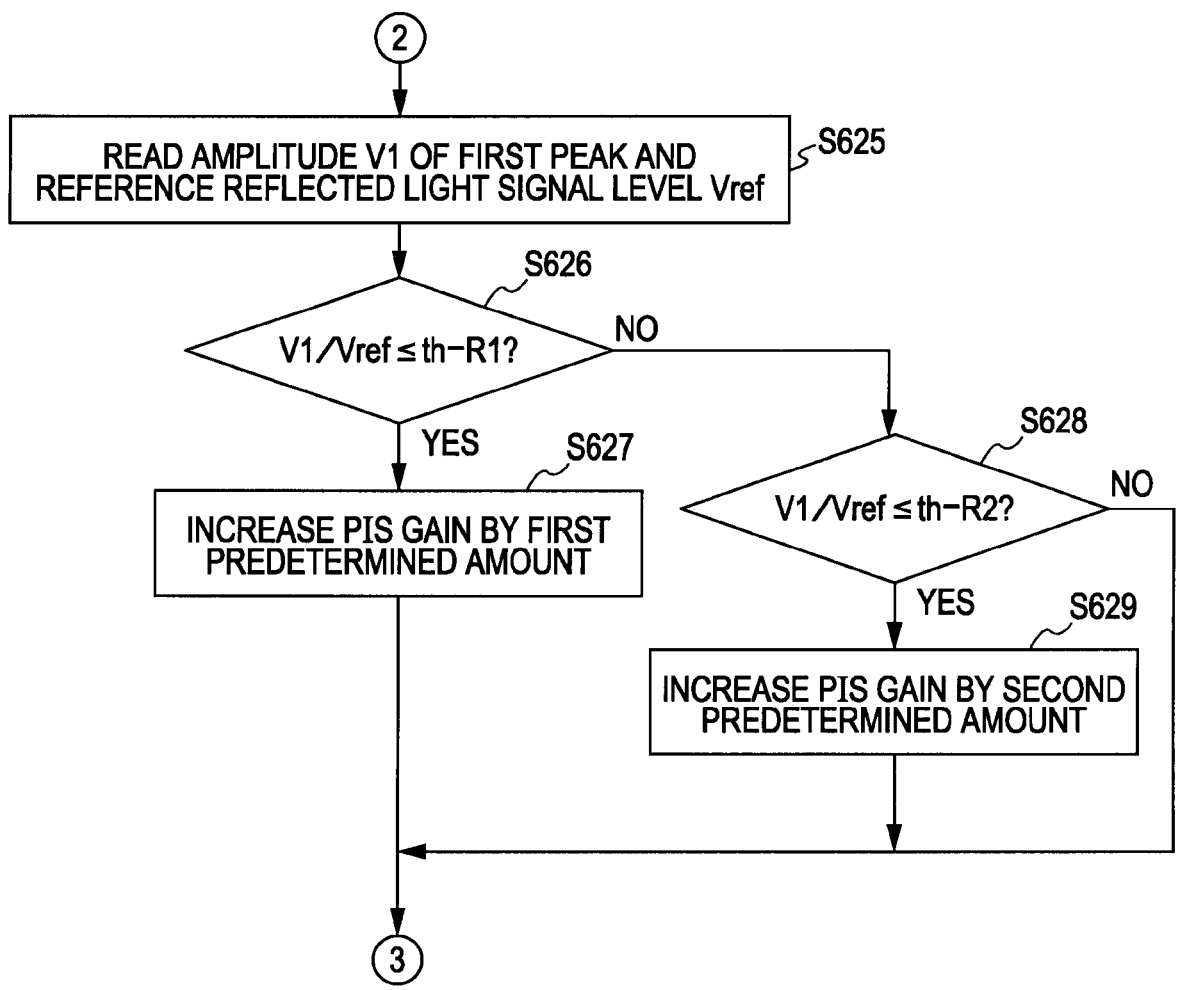
FIG. 16 is a flow chart associated with a process of controlling the gain of a reflected light signal according to an embodiment of the present invention.

If it is determined in step S622 that the BD is of the SL type, or if it is determined differently in step S623 that the BD is of the DL type, the process proceeds to step S625 in FIG. 16.

FIG. 16 illustrates a process of adjusting the gain of the reflected light signal.

First, in step S625, the amplitude V1 of a first peak and the reference level Vref of the reflected light signal are read. More specifically, the amplitude V1 of the first peak detected in step S601 in FIG. 14 is read from the memory, and the reference level Vref of the reflected light signal is also read from the memory.

Next, in step S626, a determination is made as to whether V1/Vref≦th-R1. More specifically, it is determined whether V1/Vref is equal to or smaller than the threshold value th-R1 set to 0.4.

If the determination in step S626 as to whether V1/Vref≦th-R1 is affirmative, the process proceeds to step S627. In step S627, the gain of the pull-in signal PI is increased by a first predetermined amount. More specifically, for example, the gain of an amplifier, in the matrix circuit 4, for amplifying the reflected light signal is increased by the first predetermined amount (for example, 6 dB).

If the determination in step S626 as to whether V1/Vref≦th-R1 is negative, the process proceeds to step S628. In step S628, a determination is made as to whether V1/Vref≦th-R2. Note that the threshold value th-R2 is set to a value (for example, 0.6) greater than the threshold value th-R1 (for example, 0.4).

If the determination as to whether V1/Vref≦th-R2 is affirmative, the process proceeds to step S629. In step S629, the gain of the pull-in signal PI is increased by a second predetermined amount by increasing the gain of the amplifier in the matrix circuit 4 by the second predetermined amount (for example, 3 dB).

Figure 17:
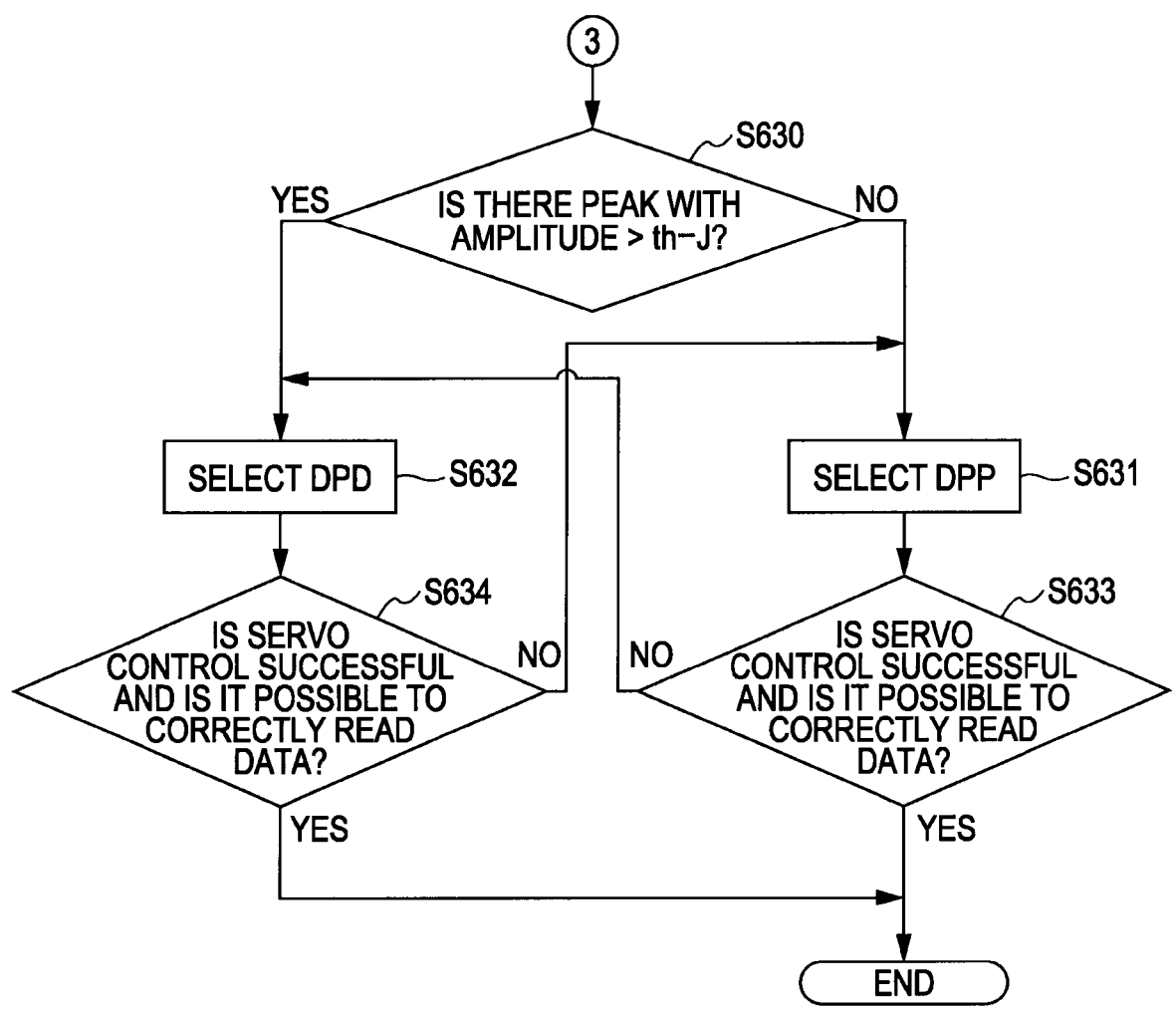
FIG. 17 is a flow chart associated with a process of selecting a DPP mode or a DPD mode for a BD, according to an embodiment of the present invention.

In FIG. 16, if the determination in step S628 as to whether V1/Vref≦th-R2 is negative, the process proceeds to step S630 in FIG. 17. The process also proceeds to step S630, when step S629 or S627 is completed.

FIG. 17 illustrates a process of selecting the DPP/DPD tracking mode.

This process shown in FIG. 17 is performed in a similar manner to the process shown in FIG. 13. That is, steps S630 to S634 in FIG. 17 are performed in a similar manner to step S502 to S506 in FIG. 13.

Although not shown in FIG. 17, a limit is imposed on the number of times that the tracking mode is switched into the other tracking mode when data cannot be correctly read, so that the endless execution of a loop is prevented. For example, the number of times is limited to once.

Thus, the operation according to the fourth embodiment is completed.

In the fourth embodiment described above, as shown in FIG. 14, the process of determining whether the mounted optical disk D is a BD or a DVD/CD is performed in a similar manner to the process according to the second embodiment. In the second embodiment described above, the determination of whether the optical disk D is a BD or a DVD/CD is performed without taking into account noise peaks of the BD such as those taken into account in the first embodiment. Note that even in a case where noise peaks occur, the process shown in FIG. 14 allows it to correctly determine whether the mounted optical disk D is a BD or a DVD/CD.

As described above with reference to FIG. 4, four patterns including noise peaks are possible for the reflected light signal from a BD of the single layer type. They are:

pattern A including a peak due to reflection at the disk surface, and a peak due to reflection at the recording layer, pattern B including a peak due to reflection at the disk surface, a peak due to reflection at the recording layer, and a noise peak appearing after the peak due to reflection at the recording layer, pattern C including a noise peak appearing before a peak due to reflection at the disk surface, a peak due to reflection at the disk surface, and a peak due to reflection at the recording layer, and pattern D including a noise peak appearing before a peak due to reflection at the disk surface, the peak due to reflection at the disk surface, a peak due to reflection at the recording layer, and a noise peak appearing after the peak due to reflection at the recording layer.

When a failure of detecting a peak due to reflection at the disk surface (referred to simply as a surface reflection peak) occurs due to a defect or dust in the determination of whether the mounted optical disk D is a BD or a DVD/CD, the number of peaks becomes equal to 1 (n=1) for the following two patterns: the pattern A including a peak due to reflection at the disk surface, and a peak due to reflection at the recording layer (note that the pattern A includes no noise peak), and the pattern C including a noise peak appearing before a peak due to reflection at the disk surface, a peak due to reflection at the disk surface, and a peak due to reflection at the recording layer. Note that in the case of the pattern C, when the peak due to reflection at the disk surface is not detected, the noise peak does not appear before the peak due to reflection at the disk surface, and thus only the peak due to reflection at the recording layer is detected. Thus, the number of peaks n=1.

As can be understood from the above discussion, when only one peak is detected as a result of a failure of detecting a surface reflection peak, it is possible to correctly determine whether the mounted optical disk D is a BD or a DVD/CD by performing the process shown in FIG. 14 in a similar manner to the process according to the second embodiment.

If a peak due to reflection at the disk surface is not detected in other patterns, incorrect determinations can occur as described below.

If a surface reflection peak is not detected for pattern B including a peak due to reflection at the disk surface, a peak due to reflection at the recording layer, and a noise peak appearing after the peak due to reflection at the recording layer, then the pattern is incorrectly determined as a pattern including the peak due to reflection at the recording layer, and the noise peak appearing after the peak due to reflection at the recording layer, and thus two peaks are detected (n=2).

If a surface reflection peak is not detected for pattern D including a noise peak appearing before a peak due to reflection at the disk surface, the peak due to reflection at the disk surface, a peak due to reflection at the recording layer, and a noise peak appearing after the peak due to reflection at the recording layer, then the pattern is incorrectly determined as a pattern including the peak due to reflection at the recording layer, and the noise peak appearing after the peak due to reflection at the recording layer, and thus two peaks are detected (n=2).

That is, if a surface reflection peak is not detected for patterns including a peak appearing after a peak due to reflection at the recording layer, the result is that two peaks are detected (n=2).

In the operation shown in FIG. 14, when the number of peaks is incorrectly determined as n=2 due to a failure of detecting a surface reflection peak, the processing flow proceeds from step S601 to S612 to determine whether the distance between the first peak and the second peak has a value corresponding to 0.3 mm or less, thereby ensuring that the determination as to whether the optical disk D is a BD or not is correctly made.

That is, when a failure of detecting the surface reflection peak occurs for the pattern B including a peak due to reflection at the disk surface, a peak due to reflection at the recording layer, and a noise peak appearing after the peak due to reflection at the recording layer, and for the pattern C including a noise peak appearing before a peak due to reflection at the disk surface, a peak due to reflection at the disk surface, and a peak due to reflection at the recording layer, the distance between the first peak and the second peak in the resultant pattern has a value corresponding to 0.3 mm or less, and thus the optical disk D is correctly determined as a BD in both cases.

Even in the case where it is assumed that the laser spot of the laser beam for use with the BD cannot reach the recording layer of the DVD/CD disk (that is, it is assumed that n is always equal to 1 for the DVD/CD disk), and thus the determination in step S612 as to whether the distance between the first peak and the second peak has a value corresponding to 0.3 mm or less is not performed, it is possible to correctly determine that the optical disk D is a BD when the reflected light signal has the pattern B including a peak due to reflection at the disk surface, a peak due to reflection at the recording layer, and a noise peak appearing after the peak due to reflection at the recording layer, or the pattern C including a noise peak appearing before a peak due to reflection at the disk surface, a peak due to reflection at the disk surface, and a peak due to reflection at the recording layer, by checking whether the number of peaks $n \geq 2$.

By performing the process in a similar manner to the second embodiment as described above, it is possible to correctly determine whether the mounted optical disk D is a BD or a DVD/CD even when the reflected light signal includes one or more noise peaks.

If an occurrence of a noise peak is taken into account in the process of adjusting the gain of the reflected light signal shown in FIG. 16, a first peak is not necessarily a peak due to reflection at the disk surface, because if a noise peak appears before the peak due to reflection at the disk surface, the noise peak is detected first.

However, as described above, the noise peak appearing before the surface reflection peak has an amplitude corresponding to a reflectivity of 4 to 5% which is similar to the amplitude of the surface reflection peak. Therefore, even if the sensitivity of the photodector is adjusted by regarding any first peak as the surface reflection peak in the process shown in FIG. 16 regardless of whether a noise peak appearing before the real surface reflection peak occurs or not, the resultant adjustment is correct.

In the fourth embodiment described above, the process in FIG. 15 of determining whether the BD is the SL type or the DL type is performed in a similar manner to the process shown in FIG. 5. Alternatively, the process may be performed in a similar manner to the process shown in FIG. 6.

The process in FIG. 17 of selecting the DPP/DPD tracking mode is performed in a similar manner to the process shown in FIG. 13. Alternatively, the process may be performed in a similar manner to the process shown in FIG. 12.

In the fourth embodiment described above, the process shown in FIG. 16 of adjusting the gain of the reflected light signal is performed after the process of determining whether the BD is the SL type or the DL type. Alternatively, the gain adjustment may be performed after an optical disk D is mounted and before the determination of whether the optical disk D is a BD or a DVD/CD.

In the fourth embodiment described above, the process in step S601 to detect peaks in the pull-in signal PI is performed only once, and the result is used in all processes shown in FIGS. 14 to 17. This allows a reduction in the total time needed to perform the process starting with the determination of the disk type and ending with the selection of the DPP/DPD tracking mode. When the reduction in the processing time is not important, it is possible to perform the peak detection separately for each of the processes shown in FIGS. 14 to 17.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium drive apparatus comprising:
    head means for emitting a leaser beam so as to illuminate an optical recording medium via an objective lens which is disposed such that the objective lens is movable at least toward and apart from the optical recording medium in a focusing direction, and for detecting light reflected from the optical recording medium being illuminated with the laser beam;
    focusing means for driving the objective lens in the focusing direction;
    signal generation means for generating a reflected light signal in accordance with the reflected light detected by the head means; and
    control means for driving the objective lens via the focusing means, detecting a peak or peaks of the reflected light signal obtained when the objective lens is driven, determining whether a pattern of the detected peak(s) is similar to one of patterns which can occur when the optical recording medium is of a single layer type, and determining whether the optical recording medium is of the single layer type or a multiple layer type on the basis of the result of the determination as to the pattern.

2. The optical recording medium drive apparatus according to claim 1, wherein the control means determines whether the optical recording medium is of the single layer type or the multiple layer type by determining whether the number of peaks and the difference in amplitude among particular peaks detected in the reflected light signal satisfy a criterion in terms of the number of peaks and the difference in amplitude among particular peaks predefined based on patterns of peaks which are possible for the optical recording medium of the single layer type.

3. A method of determining the number of layers of an optical recording medium drive apparatus including head means for emitting a leaser beam so as to illuminate an optical recording medium via an objective lens which is disposed such that the objective lens is movable at least toward and apart from the optical recording medium in a focusing direction, and for detecting light reflected from the optical recording medium being illuminated with the laser beam, focusing means for driving the objective lens in the focusing direction, and signal generation means for generating a reflected light signal in accordance with the reflected light detected by the head means, the method comprising the steps of:
    driving the objective lens by controlling the focusing means;
    detecting a peak or peaks of the reflected light signal obtained when the objective lens is driven;
    determining whether a pattern of the detected peak(s) is similar to one of patterns which can occur when the optical recording medium is of a single layer type; and determining whether the optical recording medium is of the single layer type or a multiple layer type on the basis of the result of the determination as to the pattern.

4. An optical recording medium drive apparatus comprising:
- a head adapted to emit a leaser beam so as to illuminate an optical recording medium via an objective lens which is disposed such that the objective lens is movable at least toward and apart from the optical recording medium in a focusing direction, and for detecting light reflected from the optical recording medium being illuminated with the laser beam;
- a focusing unit adapted to drive the objective lens in the focusing direction;
- a signal generator adapted to generate a reflected light signal in accordance with the reflected light detected by the head; and
- a controller adapted to drive the objective lens via the focusing unit, detect a peak or peaks of the reflected light signal obtained when the objective lens is driven, determine whether a pattern of the detected peak(s) is similar to one of patterns which can occur when the optical recording medium is of a single layer type, and determine whether the optical recording medium is of the single layer type or a multiple layer type on the basis of the result of the determination as to the pattern.

* * * * *